United States Patent
Aikawa et al.

(10) Patent No.: US 8,882,321 B2
(45) Date of Patent: Nov. 11, 2014

(54) LIGHT SOURCE DEVICE WITH OPTICAL ELEMENT AND WAVELENGTH CONVERSION MEMBER

(71) Applicant: Olympus Corporation, Tokyo (JP)

(72) Inventors: Yoshie Aikawa, Sagamihara (JP); Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/791,932

(22) Filed: Mar. 9, 2013

(65) Prior Publication Data

US 2013/0194822 A1   Aug. 1, 2013

Related U.S. Application Data

(63) Continuation of application No. PCT/JP2011/071871, filed on Sep. 26, 2011.

(30) Foreign Application Priority Data

Sep. 28, 2010   (JP) ................. 2010-217903

(51) Int. Cl.

| F21V 9/00 | (2006.01) |
|---|---|
| G02B 5/18 | (2006.01) |
| F21V 13/12 | (2006.01) |
| F21V 9/16 | (2006.01) |
| F21V 8/00 | (2006.01) |
| G02B 6/36 | (2006.01) |
| G02B 6/24 | (2006.01) |
| F21V 7/04 | (2006.01) |

(52) U.S. Cl.

CPC .............. *F21V 9/00* (2013.01); *G02B 5/1861* (2013.01); *G02B 6/3624* (2013.01); *F21V 13/12* (2013.01); *F21V 9/16* (2013.01); *G02B 6/0008* (2013.01); *G02B 6/24* (2013.01); *F21V 7/041* (2013.01)

USPC ................ 362/583; 362/249.02; 313/498

(58) Field of Classification Search
USPC ................... 362/84, 583, 249.02
See application file for complete search history.

(56) References Cited

U.S. PATENT DOCUMENTS

2008/0089089 A1*   4/2008   Hama et al. ............ 362/574

FOREIGN PATENT DOCUMENTS

| JP | 2007-220326 A | 8/2007 |
|---|---|---|
| JP | 2009-099525 A | 5/2009 |
| JP | 2010-160948 A | 7/2010 |
| WO | WO 2006/038502 A1 | 4/2006 |

OTHER PUBLICATIONS

Toshiya et al, Japanese Patent Application Publication 2009-099525, May 2009, Machine Translation.*

(Continued)

*Primary Examiner* — Tracie Y Green
(74) *Attorney, Agent, or Firm* — Scully, Scott, Murphy & Presser, PC

(57) ABSTRACT

A light source device includes an excitation light source, a light guide member and a wavelength conversion unit. The wavelength conversion unit includes an optical element disposed on an optical axis and with which excitation light emitted from the light guide member is irradiated to reflect, scatter, or diffract the excitation light, a wavelength conversion member disposed on an optical path of the excitation light reflected, scattered, or diffracted by the optical element to convert the excitation light into wavelength converted light and an emission opening portion that emits the wavelength converted light converted by the wavelength conversion member.

22 Claims, 6 Drawing Sheets

(56) References Cited

OTHER PUBLICATIONS

Hama et al, Japanese PCT publication WO2006-038502, Apr. 2006, machine translation.*

International Search Report dated Jan. 10, 2012 issued in PCT/JP2011/071871.
International Preliminary Report on Patentability together with the Written Opinion dated Apr. 25, 2013 received in related International Application No. PCT/JP2011/071871.

* cited by examiner

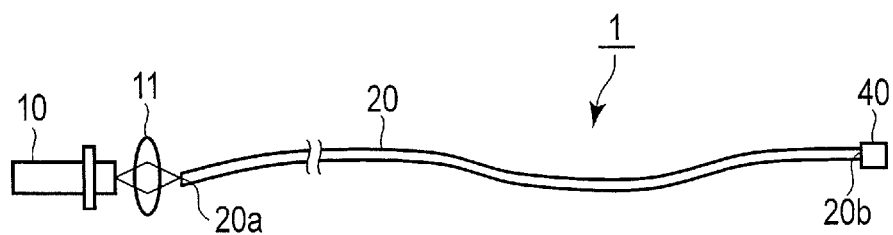
F I G. 1
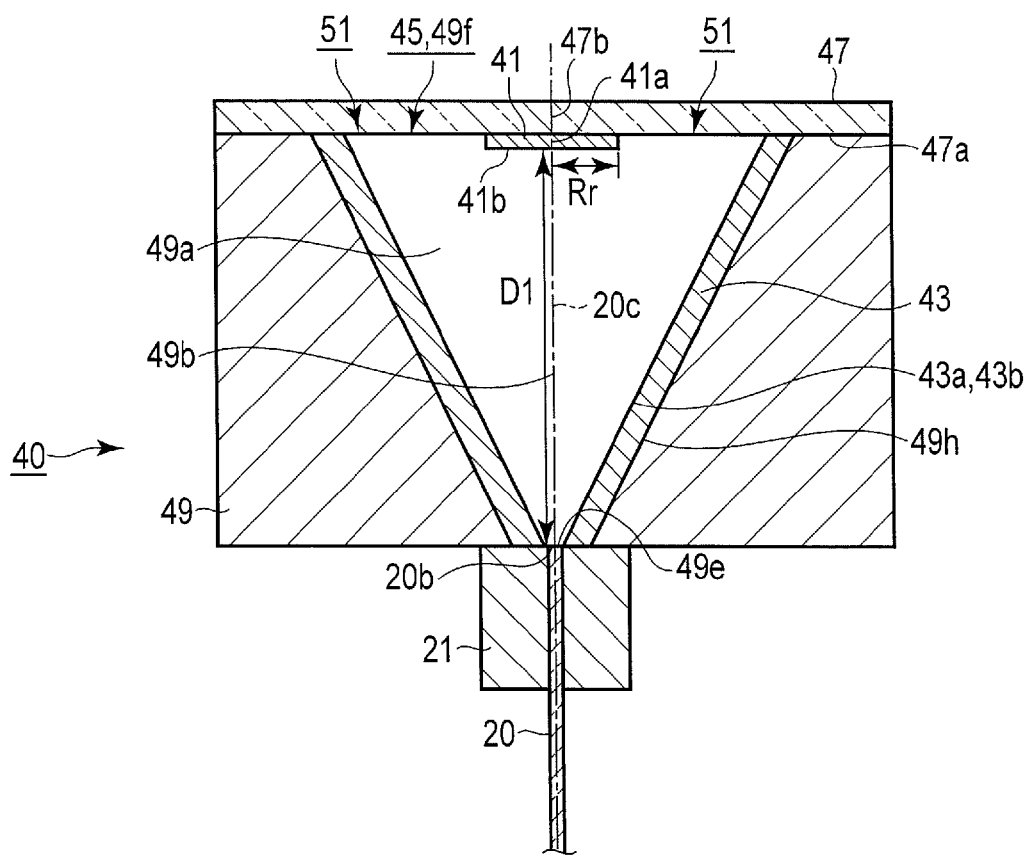
F I G. 2

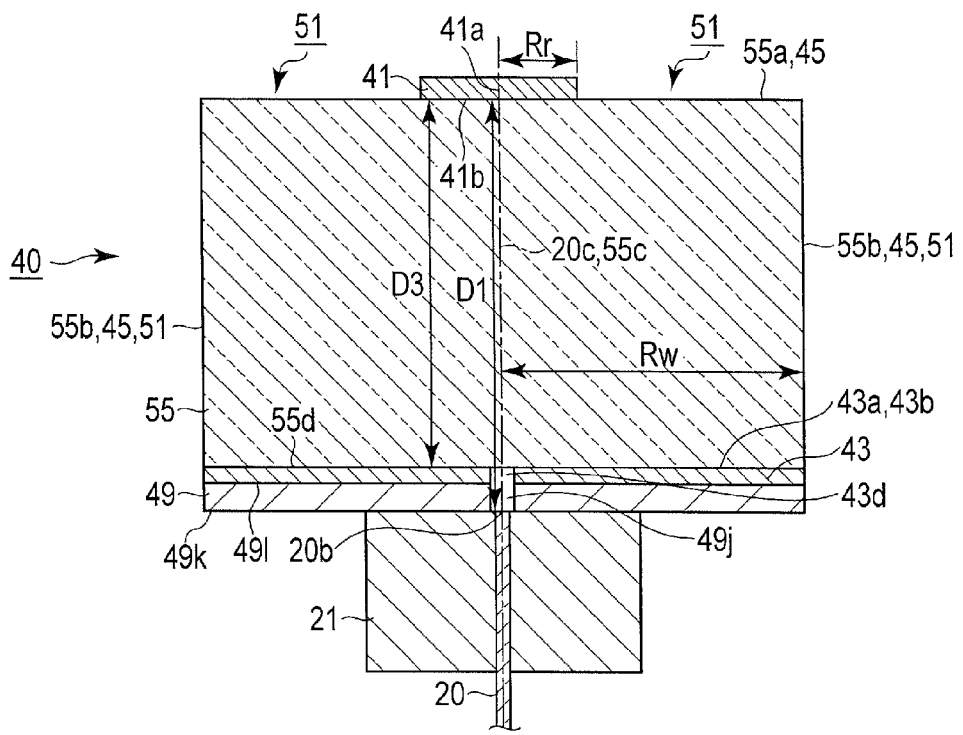
F I G. 5
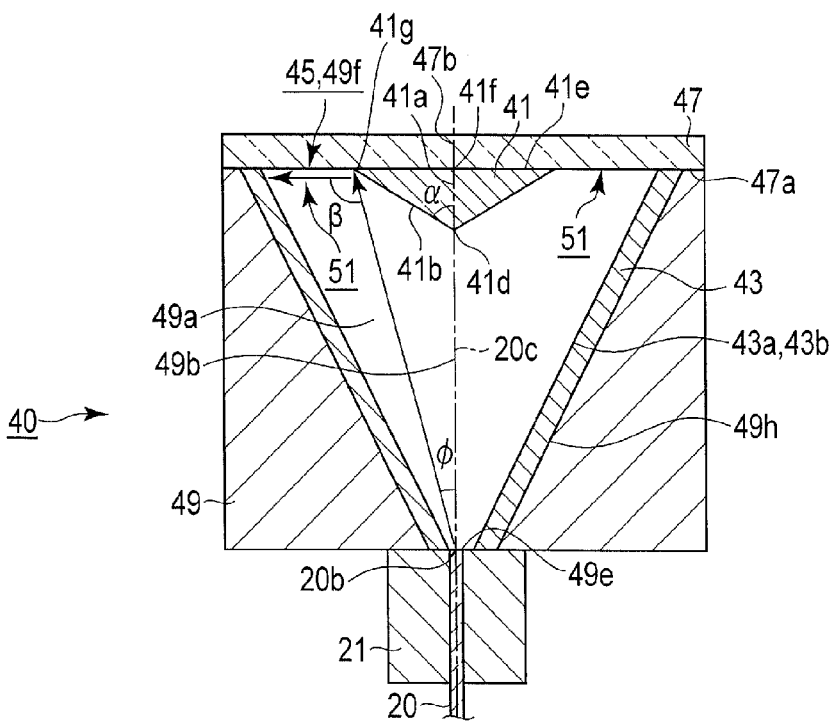
F I G. 6

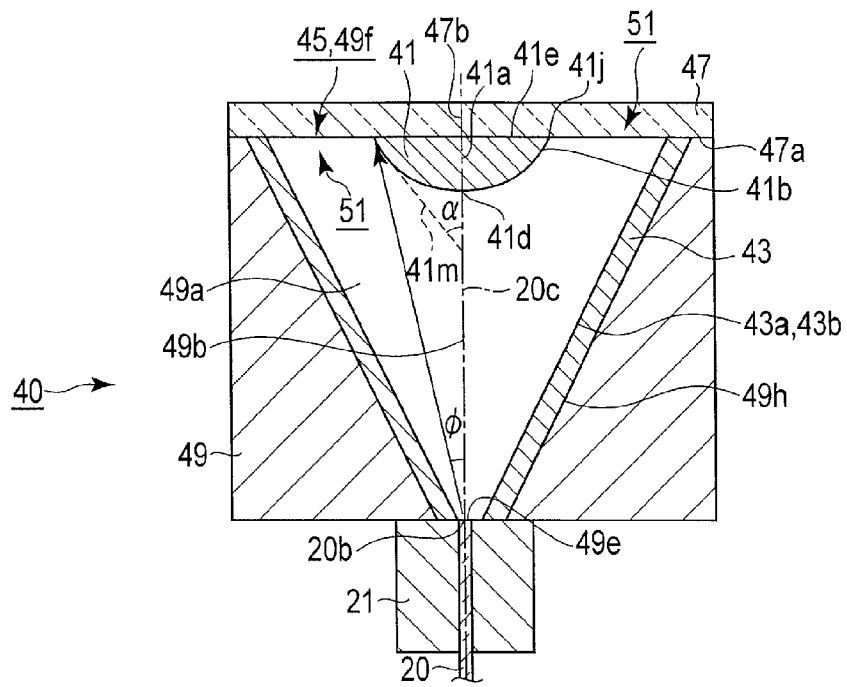
F I G. 7
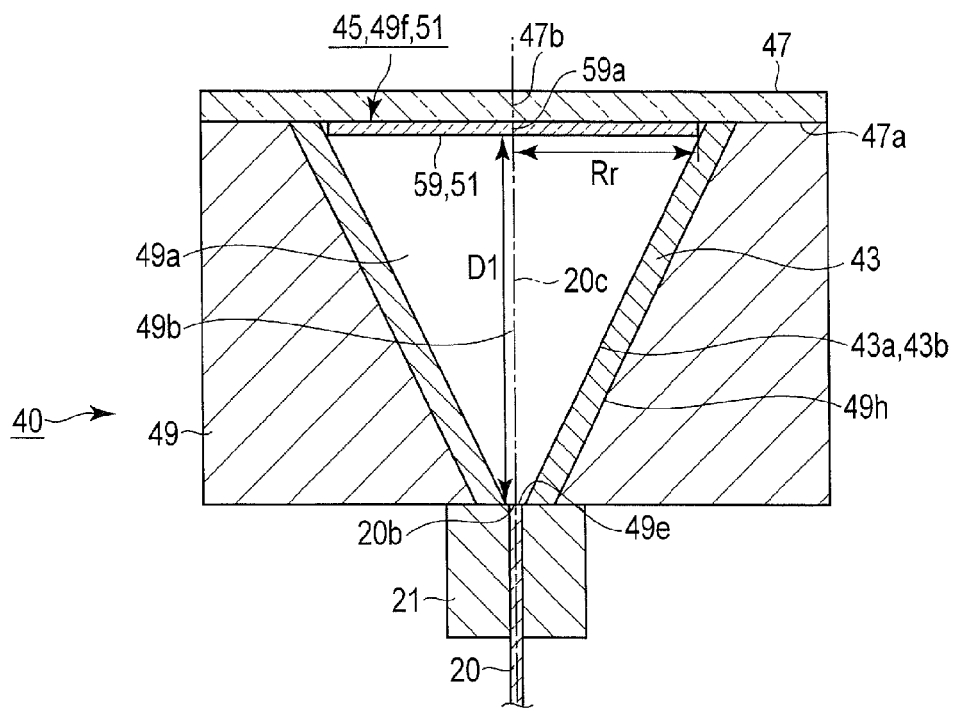
F I G. 8

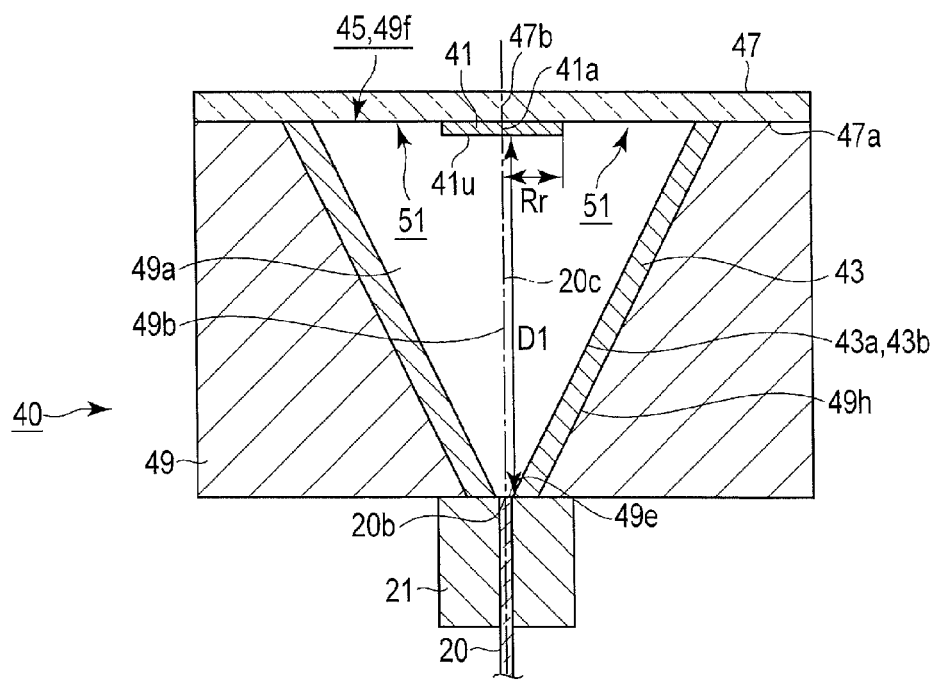
F I G. 11
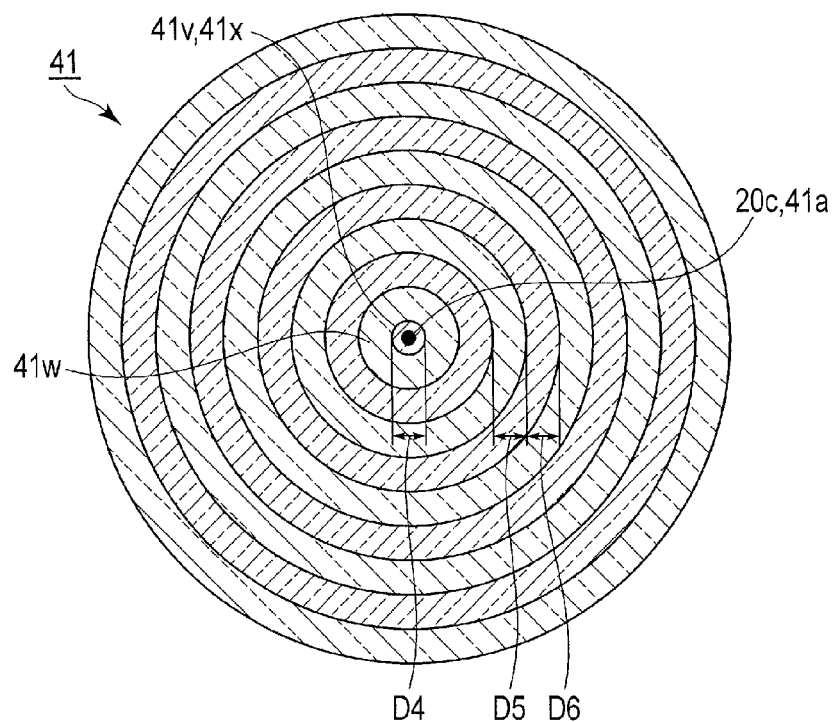
F I G. 12

LIGHT SOURCE DEVICE WITH OPTICAL ELEMENT AND WAVELENGTH CONVERSION MEMBER

CROSS-REFERENCE TO RELATED APPLICATIONS

This application is a Continuation application of PCT Application No. PCT/JP2011/071871, filed Sep. 26, 2011 and based upon and claiming the benefit of priority from prior Japanese Patent Application No. 2010-217903, filed Sep. 28, 2010, the entire contents of all of which are incorporated herein by reference.

BACKGROUND OF THE INVENTION

1. Field of the Invention

The present invention relates to a light source device that illuminates an object with fluorescence.

2. Description of the Related Art

In recent years, an illuminating device that emits light from the tip of a narrow structure is proposed. The structure is constructed by combining a light source and an optical fiber. Such an illuminating device is disclosed in, for example, Jpn. Pat. Appln. KOKAI Publication No. 2007-220326. Jpn. Pat. Appln. KOKAI Publication No. 2007-220326, an excitation light source is connected to one end of a light guide and the other end of the light guide is in contact with a portion on a wavelength conversion member. The excitation light source emits excitation light and the light guide guides the excitation light up to the portion on the wavelength conversion member. Then, the wavelength conversion member absorbs the excitation light and converts the wavelength of the absorbed excitation light to emit the light as illumination light.

The other end of the light guide is, as described above, in contact with the portion on the wavelength conversion member. Thus, the irradiation region of the wavelength conversion member irradiated with the excitation light guided by the light guide is concentrated in the portion on the wavelength conversion member.

The wavelength conversion member generates heat by absorbing excitation light and converting the wavelength of the absorbed excitation light to emit the light as illumination light. As described above, the irradiation region is concentrated in a portion on the wavelength conversion member, heat generation is also concentrated in the portion. Accordingly, heat generation accompanying wavelength conversion is partial, and as a result the temperature of the portion of the wavelength conversion member rises and the portion of the wavelength conversion member is heated.

In general, when the wavelength conversion member is heated even partially, the efficiency of wavelength conversion of the wavelength conversion member declines or the spectrum of wavelength converted light changes. Accordingly, the brightness (amount of light) of illumination light emitted from the illuminating device decreases and the color of the illumination light changes, and as a result, desired optical characteristics may not be obtained.

BRIEF SUMMARY OF THE INVENTION

The present invention is made in view of the above circumstances and an object thereof is to provide a light source device capable of preventing a partial rise of temperature of a wavelength conversion member and having desired optical characteristics.

According to an aspect of embodiments, a light source device includes an excitation light source that emits excitation light, a light guide member including a light guide incidence end face through which the excitation light emitted from the excitation light source incidents and a light guide emission end face from which the excitation light is emitted, and guiding the excitation light from the light guide incidence end face to the light guide emission end face, and a wavelength conversion unit that converts the excitation light emitted from the light guide emission end face into wavelength converted light having a desired wavelength, wherein the wavelength conversion unit includes an optical element disposed on an optical axis as a center axis of the excitation light emitted from the light guide emission end face and with which the excitation light emitted from the light guide emission end face is irradiated to reflect, scatter, or diffract the excitation light, a wavelength conversion member disposed on an optical path of the excitation light reflected, scattered, or diffracted by the optical element and with which the excitation light is irradiated when the excitation light is reflected, scattered, or diffracted to convert the irradiated excitation light into the wavelength converted light and an emission opening portion that emits the wavelength converted light converted by the wavelength conversion member to an outside of the wavelength conversion unit.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an external view of a light source device according to a first embodiment of the present invention.

FIG. 2 is a diagram showing an internal configuration of a wavelength conversion unit.

FIG. 5 is a diagram showing the internal configuration of a wavelength conversion unit according to a second embodiment of the present invention.

FIG. 6 is a diagram showing the internal configuration of a wavelength conversion unit according to a third embodiment of the present invention.

FIG. 7 is a diagram showing the internal configuration of a wavelength conversion unit according to a modification of the third embodiment.

FIG. 8 is a diagram showing the internal configuration of a wavelength conversion unit according to a fourth embodiment of the present invention.

FIG. 11 is a diagram showing the internal configuration of a wavelength conversion unit according to a sixth embodiment.

FIG. 12 is a front view of a diffractive optical element when viewed from an optical fiber side.

DETAILED DESCRIPTION OF THE INVENTION

Figure 3:
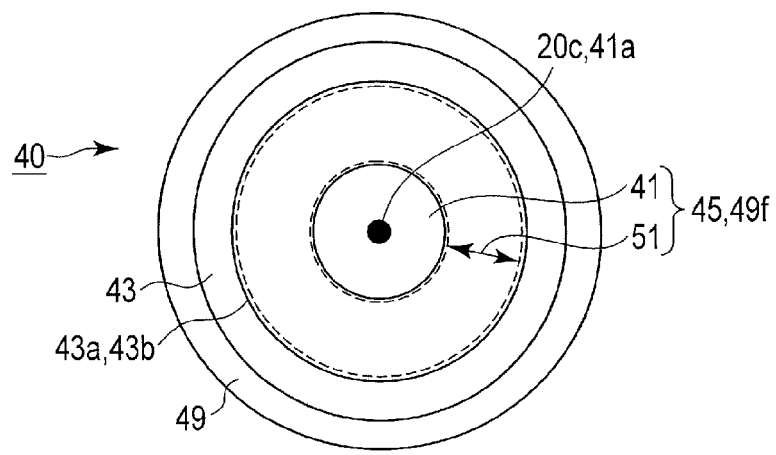
FIG. 3 is a front view of the wavelength conversion unit.

The embodiments of the present invention will be described below in detail with reference to the drawings.

The first embodiment will be described with reference to FIGS. 1, 2, and 3. An optical axis 20c is a center axis of light emitted from an emission end face 20b. For example, in FIG. 3, the illustration of a transparent retainer plate 47 is omitted for the simplification of illustration. Thus, the illustration of a portion of members is omitted in a portion of drawings for the simplification of illustration.

As shown in FIG. 1, a light source device 1 includes an excitation light source 10 that emits excitation light and a lens 11 that condenses excitation light emitted from the excitation light source 10. The light source device 1 further includes an optical fiber 20 having an incidence end face 20a on which excitation light condensed by the lens 11 is incident and an emission end face 20b from which excitation light is emitted and serving as a light guiding member that guides excitation light from the incidence end face 20a to the emission end face 20b. The light source device 1 further includes a wavelength conversion unit 40 with which the emission end face 20b of the optical fiber 20 is in contact and which converts excitation light emitted from the emission end face 20b into wavelength converted light having a desired wavelength.

The excitation light source 10 is, for example, a semiconductor laser that emits violet laser light whose wavelength is near, for example, 400 nm. The laser light becomes excitation light.

A multimode fiber whose numerical aperture NA is about 0.22 and whose core diameter is 50 μm is used as the optical fiber 20. As shown in FIG. 2, the optical fiber 20 is held by a ferrule 21 as a holding member. The ferrule 21 is fixed to a holding member 49 described later so that the emission end face 20b is opposed to an optical element 41 described later. The optical fiber 20 is elongated, the emission end face 20b is disposed at one end of the optical fiber 20, and the incidence end face 20a is disposed at the other end of the optical fiber 20.

As shown in FIG. 2, the wavelength conversion unit 40 includes the optical element 41, a wavelength conversion member 43, and an emission opening portion 45.

The optical element 41 is disposed on the optical axis 20c. For example, the optical element 41 in its entirety is irradiated with excitation light emitted from the emission end face 20b. The optical element 41 causes one of reflection, scattering, and diffraction to excitation light.

The wavelength conversion member 43 is disposed on an optical path of excitation light whose reflection, scattering, or diffraction has been caused by the optical element 41. When one of reflection, scattering, and diffraction is caused, for example, the wavelength conversion member 43 in its entirety is irradiated with excitation light having undergone one of reflection, scattering, and diffraction to convert the excitation light into wavelength converted light.

The emission opening portion 45 emits wavelength converted light converted by the wavelength conversion member 43 to the outside of the wavelength conversion unit 40.

The wavelength conversion unit 40 also includes the transparent retainer plate 47 holding the optical element 41 and transmitting to emitting wavelength converted light converted by the wavelength conversion member 43 to the outside of the wavelength conversion unit 40 and the holding member 49 holding the wavelength conversion member 43, the transparent retainer plate 47, and the emission opening portion 45.

The optical element 41 in the present embodiment is a mirror surface that, for example, regularly reflects excitation light. That is, the optical element 41 in the present embodiment is a reflecting optical element that reflects excitation light. The optical element 41 also reflects wavelength converted light converted by the wavelength conversion member 43, as well as excitation light. The optical element 41 as described above includes, as shown in FIG. 2, a reflecting surface 41b that reflects excitation light and wavelength converted light. The reflecting surface 41b indicates the entire surface of the optical element 41 on the side of the emission end face 20b. In this case, the reflecting surface 41b is opposed to the emission end face 20b.

As shown in FIG. 2, the optical element 41 is disposed in front of the emission end face 20b, i.e., is opposed to the emission end face 20b in the emission direction of excitation light. More specifically, a center axis 41a of the optical element 41 is disposed on the optical axis 20c. The optical element 41 is disposed directly on an end face 47a of the transparent retainer plate 47 disposed on the side of the emission end face 20b. The optical element 41 is disposed inside the holding member 49.

Incidentally, the optical element 41 (reflecting surface 41b) is larger than the emission end face 20b. The optical element 41 is, for example, a flat plate. The reflecting surface 41b is, for example, a plane. The optical element 41 has, for example, a circular shape.

As shown in FIG. 2, the wavelength conversion member 43 includes an incidence end face 43a on which excitation light is incident when the wavelength conversion member 43 is irradiated with the excitation light and an emission end face 43b from which wavelength converted light is emitted. In the present embodiment, excitation light emitted from the emission end face 20b of the optical fiber 20 and reflected by the optical element 41 is incident on the incidence end face 43a. The incidence end face 43a and the emission end face 43b are the same surface, are disposed on the entire surface of an inner circumferential surface 49h of the holding member 49, and are in contact with a through hole portion 49a described later. The incidence end face 43a and the emission end face 43b are the entire surface of the wavelength conversion member 43. The wavelength conversion member 43 as described above is irradiated with excitation light by the optical element 41 in the substantially entire surface of the wavelength conversion member 43, is not irradiated in a portion of the wavelength conversion member 43. Also, the wavelength conversion member 43 emits wavelength converted light from the substantially entire surface of the wavelength conversion member 43, does not emit wavelength converted light form a portion of the wavelength conversion member 43. In this case, the incidence end face 43a becomes an irradiation region irradiated with excitation light.

The wavelength conversion member 43 absorbs excitation light emitted from the emission end face 20b of the optical fiber 20 and reflected by the optical element 41 through the incidence end face 43a. The wavelength conversion member 43 converts the absorbed excitation light into wavelength converted light having, for example, a wavelength longer than that of the excitation light to emit the wavelength converted light from the emission end face 43b.

Such wavelength converted light is, for example, fluorescence. The wavelength conversion member 43 generates heat when converting excitation light into wavelength converted light.

In the present embodiment, the wavelength conversion member 43 is formed by an ordinary powder fluorescent member and resin being mixed and cured.

The powder fluorescent member is, for example, a Ce activated silicate fluorescent member. The Ce activated silicate fluorescent member absorbs excitation light whose wavelength is about 400 nm and converts the excitation light into fluorescence having a peak about 570 nm.

The resin needs only to have properties to allow excitation light and fluorescence to transmit. If, for example, a silicon resin with high light fastness is used, the degradation of the resin caused by irradiation of light is reduced.

The wavelength conversion member 43 having the above configuration converts, as described above, excitation light into fluorescence as a wavelength converted light. The fluorescence becomes illumination light with which an object (not shown) is illuminated after being emitted to the outside of the wavelength conversion unit 40.

The thickness of the wavelength conversion member 43 and the concentration of the powder fluorescent member with respect to the resin are set to desired values so that the excitation light reflected by the optical element 41 is sufficiently absorbed inside the wavelength conversion member 43.

As shown in FIG. 2, the transparent retainer plate 47 holds the optical element 41 in such a way that the center axis 41a of the optical element 41 is disposed on the optical axis 20c, and further, the optical element 41 is disposed on the same surface as the emission opening portion 45 of the wavelength conversion unit 40.

The diameter of the transparent retainer plate 47 is substantially the same as that of the holding member 49 and is larger than a large hole portion 49f of the through hole portion 49a described later. The transparent retainer plate 47 is held by the holding member 49 so as to be adjacent to the hole portion 49f in front of the hole portion 49f. The front indicates the traveling direction of light.

A center axis 47b of the transparent retainer plate 47 is disposed, like the center axis 41a of the optical element 41, on the optical axis 20c. The transparent retainer plate 47 is, for example, a flat plate. The transparent retainer plate 47 has, for example, a circular shape.

As shown in FIG. 2, the holding member 49 has the through hole portion 49a in a truncated conical shape. A center axis 49b of the through hole portion 49a is disposed on the optical axis 20c. The through hole portion 49a passes through the holding member 49 along the optical axis 20c.

The emission end face 20b is disposed in a small hole portion 49e as a first through hole portion of the through hole portion 49a so as to be opposed to the optical element 41. The emission end face 20b may be apart from the hole portion 49e, that is, may be disposed near the hole portion 49e as long as the emission end face 20b can be opposed to the optical element 41. The hole portion 49e becomes an incidence opening portion of the wavelength conversion unit 40 through which excitation light enters the wavelength conversion unit 40 (holding member 49). The center of the hole portion 49e is disposed on the optical axis 20c.

The diameter of the large hole portion 49f as a second through hole portion of the through hole portion 49a is smaller than that of the transparent retainer plate 47. The center of the hole portion 49f is disposed on the optical axis 20c. The hole portion 49f becomes the emission opening portion 45 from which wavelength converted light is emitted to the outside of the wavelength conversion unit 40. The through hole portion 49a increases in diameter from the small hole portion 49e toward the large hole portion 49f.

The transparent retainer plate 47 is disposed on the holding member 49 in front of the hole portion 49f and adjacent to the hole portion 49f. That is, the hole portion 49f is capped by the transparent retainer plate 47. The holding member 49 holds the optical element 41 indirectly via the transparent retainer plate 47. More specifically, the holding member 49 holds the optical element 41 via the transparent retainer plate 47 in such a way that the center axis 41a of the optical element 41 is disposed on the optical axis 20c and the optical element 41 is disposed on the same surface as the emission opening portion 45 of the wavelength conversion unit 40.

The wavelength conversion member 43 is disposed on the entire surface of the inner circumferential surface 49h of the holding member 49 (through hole portion 49a).

Thus, the holding member 49 holds the optical element 41 in the hole portion 49f via the transparent retainer plate 47 and holds the wavelength conversion member 43 on the entire surface of the inner circumferential surface 49h. Therefore, the wavelength conversion member 43 is a desired distance away from the optical element 41.

The emission opening portion 45 is also an emission opening portion of the wavelength conversion unit 40 from which wavelength converted light is emitted to the outside of the wavelength conversion unit 40. The emission opening portion 45 is smaller than the transparent retainer plate 47. The emission opening portion 45 is disposed in a position farthest from the emission end face 20b.

In the emission opening portion 45, as shown in FIGS. 2 and 3, a region of the emission opening portion 45 where the optical element 41 is not disposed becomes a transmission region 51 through which wavelength converted light converted by the wavelength conversion member 43 is transmitted to be emitted to the outside of the wavelength conversion unit 40. In other words, the emission opening portion 45 has the transmission region 51 in a region obtained by excluding a region where the optical element 41 is disposed from the emission opening portion 45 (hole portion 49f). Thus, the transmission region 51 indicates a region of the emission opening portion 45 where the optical element 41 is not disposed, more specifically, a region inside the emission opening portion 45 and outside the optical element 41. The transmission region 51 in the present embodiment is a passing region through which wavelength converted light passes. The transmission region 51 has, for example, a ring shape.

The holding member 49 is formed by a member with high thermal conductivity being processed or molded. The member with high thermal conductivity indicates at least one of, for example, brass and aluminum. Accordingly, when, as described above, the wavelength conversion member 43 generates heat, the holding member 49 dissipates the heat conducted from the wavelength conversion member 43 to the outside.

The center axis 49b of the through hole portion 49a is disposed, as described above, on the optical axis 20c. Thus, the optical axis 20c, the center axis 49b of the through hole portion 49a, the center axis 41a of the optical element 41, and the center axis 47b of the transparent retainer plate 47 are disposed on the same straight line.

Incidentally, the through hole portion 49a may have a shape having a portion of a sphere.

Now, the numerical aperture of the optical fiber 20 is set as NA, the distance from the emission end face 20b of the optical fiber 20 to the optical element 41 is set as D1, and the index of refraction inside the through hole portion 49a is set as n. In this case, a radius Rr of the optical element 41 can be calculated according to Formula (1) shown below:

$$Rr = D1 \times \tan(\phi) \quad \text{Formula (1)}$$

The angle ($\phi$) is a spread angle of excitation light emitted from the emission end face 20b and is calculated according to Formula (2) shown below:

$$\phi = \arcsin(NA/n) \quad \text{Formula (2)}$$

In the present embodiment, the outside diameter of the optical element 41 is formed so as to be substantially equal to that of a beam spot (excitation light irradiation region) of excitation light according to Formulas (1), (2). The beam spot of excitation light is formed on the reflecting surface 41b of the optical element 41 when excitation light emitted from the emission end face 20b of the optical fiber 20 travels toward the optical element 41 while spreading at the spread angle in accordance with the numerical aperture NA of the optical fiber 20.

By adopting the above configuration, the size of the reflecting surface 41b and the size of excitation light irradiated with the reflecting surface 41b are made to substantially match and almost all excitation light emitted from the emission end face 20b is irradiated with on the optical element 41 (reflecting surface 41b).

Next, the operation method in the present embodiment will be described.

As shown in FIG. 1, when the excitation light source 10 is turned on, excitation light is emitted. The excitation light emitted from the excitation light source 10 is condensed to the incidence end face 20a of the optical fiber 20 by the lens 11 to incident the optical fiber 20 through the incidence end face 20a. Then, the excitation light is guided from the incidence end face 20a to the emission end face 20b of the optical fiber 20 by the optical fiber 20.

As shown in FIG. 2, the excitation light guided up to the emission end face 20b is emitted from the emission end face 20b to enter the wavelength conversion unit 40 through the hole portion 49e as an incidence opening portion of the wavelength conversion unit 40.

The excitation light having incident the wavelength conversion unit 40 travels inside the through hole portion 49a toward the optical element 41 while spreading at the spread angle in accordance with the numerical aperture NA of the optical fiber 20 to irradiate with the optical element 41 (reflecting surface 41b).

At this point, the excitation light irradiated with the optical element 41 forms a beam spot on the reflecting surface 41b of the optical element 41. Thanks to the distance D1 and the radius Rr calculated based on Formulas (1), (2), the outside diameter of the beam spot is formed so as to be substantially equal to that of the optical element 41. Thus, most of the excitation light emitted from the emission end face 20b of the optical fiber 20 irradiates with the optical element 41 (reflecting surface 41b).

The excitation light having irradiated with the optical element 41 is regularly reflected by the optical element 41. Then, the excitation light travels toward the wavelength conversion member 43 disposed on the inner circumferential surface 49h of the through hole portion 49a while spreading at the spread angle in accordance with the numerical aperture NA of the optical fiber 20 to irradiate with the substantially entire surface of the wavelength conversion member 43. That is, the irradiation region (incidence end face 43a) of the wavelength conversion member 43 irradiated with excitation light is the substantially entire surface of the wavelength conversion member 43, is not being concentrated in a portion on the wavelength conversion member 43.

That is, excitation light emitted from the emission end face 20b of the optical fiber 20 irradiates indirectly on the substantially entire surface (incidence end face 43a) of the wavelength conversion member 43 via the optical element 41. At this point, the optical element 41 and the wavelength conversion member 43 are a desired distance away from each other. Therefore, the excitation light is reflected by the optical element 41 without leakage toward the wavelength conversion member 43 to irradiate with the substantially entire surface of the wavelength conversion member 43.

To sum up, excitation light is emitted from the emission end face 20b of the optical fiber 20 to travel toward the optical element 41 while spreading at the spread angle in accordance with the numerical aperture NA of the optical fiber 20 before being reflected by the optical element 41. The excitation light having been reflected by the optical element 41 travels toward the wavelength conversion member 43 while spreading at the spread angle in accordance with the numerical aperture NA of the optical fiber 20 to irradiate with the substantially entire surface of the wavelength conversion member 43, not irradiate with a portion of the wavelength conversion member 43, that is, irradiating with the wavelength conversion member 43 partially.

The excitation light having irradiated with the wavelength conversion member 43 enters the wavelength conversion member 43 through the incidence end face 43a and is gradually absorbed by the wavelength conversion member 43 while traveling inside before being converted into wavelength converted light.

Most of excitation light having incident the wavelength conversion member 43 is absorbed near the incidence end face 43a of the wavelength conversion member 43. The amount of excitation light absorbed at this point exponentially decreases in accordance with the distance which the excitation light travels inside the wavelength conversion member 43.

Wavelength converted light is generated in a portion of the wavelength conversion member 43 where excitation light is absorbed. Thus, most of the wavelength converted light is generated in a region of the wavelength conversion member 43 near the incidence end face 43a through which excitation light enters.

The wavelength converted light is emitted in various directions from the substantially entire surface (emission end face 43b) of the wavelength conversion member 43 without being affected by the incidence direction of excitation light with respect to the wavelength conversion member 43. At this point, a portion of the wavelength converted light travels inside the through hole portion 49a. The other portion of the wavelength converted light travels inside the wavelength conversion member 43 and is emitted to the outside by scattering or the like or reabsorbed by the wavelength conversion member 43 to become secondary wavelength converted light having a longer wavelength.

A portion of the wavelength converted light traveling inside the through hole portion 49a travels toward the reflecting surface 41b of the optical element 41 and is reflected by the reflecting surface 41b to irradiate with the wavelength conversion member 43. Then, the wavelength converted light is reflected or scattered by the wavelength conversion member 43 or reabsorbed by the wavelength conversion member 43 to be converted into secondary wavelength converted light having a longer wavelength.

As described above, the wavelength conversion member 43 generates heat when converting excitation light into wavelength converted light. In the present embodiment, however, excitation light irradiate the substantially entire surface of the wavelength conversion member 43, do not irradiate only a portion of the wavelength conversion member 43, that is, the wavelength conversion member 43 is partially not to be irradiated with excitation light. In other words, the irradiation region (incidence end face 43a) of the wavelength conversion member 43 irradiated with excitation light is the substantially entire surface of the wavelength conversion member 43, is not to be concentrated in a portion on the wavelength conversion member 43. Thus, there is no partial heat generation accompanying wavelength conversion and heat generation is not concentrated in the portion and so the partial rise of temperature of the wavelength conversion member 43 is prevented, the rise of temperature only in a portion of the wavelength conversion member 43 is prevented, and a portion of the wavelength conversion member 43 is prevented from being heated.

Accordingly, the decline of wavelength conversion efficiency of the wavelength conversion member 43 and changes of the spectrum of wavelength converted light are prevented. Further, the decrease of brightness (amount of light) of illumination light emitted from the light source device 1 and changes of the color of illumination light are prevented so that desired optical characteristics can be obtained.

The wavelength conversion member 43 generates wavelength converted light near the incidence end face 43a. In general, when wavelength converted light travels inside the wavelength conversion member 43, a portion of the wavelength converted light is converted into heat due to scattering or reabsorption. In the present embodiment, the incidence end face 43a and the emission end face 43b are the same surface and so the distance traveled by wavelength converted light inside the wavelength conversion member 43 is short. Accordingly, excitation light is resistant to scattering or reabsorption inside the wavelength conversion member 43, preventing heat generation accompanying scattering or reabsorption.

The wavelength conversion member 43 is a desired distance away from the optical element 41. Thus, excitation light irradiate the substantially entire surface of the wavelength conversion member 43, do not irradiate only a portion of the wavelength conversion member 43, that is, the wavelength conversion member 43 is partially not to be irradiated with excitation light. Accordingly, as described above, the rise of temperature of the wavelength conversion member 43 as a whole is prevented.

The holding member 49 is formed of a member with high thermal conductivity. Thus, when, as described above, the wavelength conversion member 43 generates heat, the holding member 49 dissipates the heat conducted from the wavelength conversion member 43 to the outside. Accordingly, the rise of temperature of the wavelength conversion member 43 as a whole is prevented.

The process as described above is repeated and a portion of wavelength converted light passes the transmission region 51 directly or via various processes, transmits through the transparent retainer plate 47, and is emitted from the wavelength conversion unit 40 to illuminate an object as illumination light.

Thus, in the present embodiment, the optical element 41 is disposed on the optical axis 20c and the wavelength conversion member 43 is disposed on an optical path of excitation light reflected by the optical element 41. Further in the present embodiment, the substantially entire surface of the optical element 41 is irradiated with excitation light and when the excitation light is reflected by the optical element 41, the substantially entire surface of the wavelength conversion member 43 is irradiated with the excitation light. That is, according to the present embodiment, excitation light irradiate the substantially entire surface of the wavelength conversion member 43, do not irradiate only a portion of the wavelength conversion member 43, that is, the wavelength conversion member 43 is not partially to be irradiated with excitation light. In other words, according to the present embodiment, the irradiation region (incidence end face 43a) of excitation light in the wavelength conversion member 43 is formed on the substantially entire surface of the wavelength conversion member 43, is not concentrate in a portion on the wavelength conversion member 43. Accordingly, in the present embodiment, the light source device 1 can prevent the rise of temperature only in a portion of the wavelength conversion member 43 and can also prevent the rise of temperature of the wavelength conversion member 43 as a whole. Accordingly, in the present embodiment, the light source device 1 can gain desired optical characteristics.

Compared with a case when, for example, the emission end face 20b of the optical fiber 20 such as a light guide is in contact with the wavelength conversion member 43, the incidence end face 43a as an irradiation region becomes wider in the present embodiment. In other words, according to the present embodiment, the amount of irradiated light of excitation light per unit area, that is, the density of excitation light on the incidence end face 43a of the wavelength conversion member 43 is smaller than in a case when the emission end face 20b of the optical fiber 20 is in contact with the wavelength conversion member 43.

In general, when the density of excitation light increases in the wavelength conversion member 43, the amount of generating heat accompanying wavelength conversion increases and the wavelength conversion efficiency of the wavelength conversion member 43 declines or the spectrum of wavelength converted light changes. As a result, the brightness (amount of light) of illumination light emitted from the light source device 1 decreases and the color of the illumination light changes, and thus the light source device 1 may not be able to obtain desired optical characteristics.

In the present embodiment, however, thanks to the configuration described above, the light source device 1 can prevent the rise of temperature only in a portion of the wavelength conversion member 43 and can also prevent the rise of temperature of the wavelength conversion member 43 as a whole. Accordingly, in the present embodiment, the light source device 1 can obtain desired optical characteristics.

Also in the present embodiment, it is assumed that the total amount of heat generated by the wavelength conversion member 43 is the same when the wavelength conversion member 43 having the same composition and the same structure is irradiated with excitation light of the same intensity. The substantially entire surface (incidence end face 43a) of the wavelength conversion member 43 is irradiated with excitation light in the present embodiment, and thus heat accompanying wavelength conversion is also generated on the substantially entire surface (incidence end face 43a) of the wavelength conversion member 43. That is, according to the present embodiment, heating of a portion of the wavelength conversion member 43 can be prevented and the rise of temperature of such portion of the wavelength conversion member 43 can be prevented. Accordingly, the decline of wavelength conversion efficiency in a portion of the wavelength conversion member 43 and changes of the spectrum of a portion of wavelength converted light are prevented. Thus, in the present embodiment, the light source device 1 can prevent the decrease of brightness (amount of light) of illumination light emitted from the light source device 1 and changes of the color of illumination light and so can gain desired optical characteristics.

Also in the present embodiment, the holding member 49 is formed of a member with high thermal conductivity. Thus, in the present embodiment, heat generated in the wavelength conversion member 43 can be dissipated to the outside after being conducted to the holding member 49, and thus the rise of temperature of the wavelength conversion member 43 can be prevented.

Also in the present embodiment, most of the wavelength converted light is generated near the incidence end face 43a in the wavelength conversion member 43. Also in the present embodiment, when wavelength converted light travels inside the wavelength conversion member 43, a portion of the wavelength converted light changes to heat due to scattering or reabsorption. In the present embodiment, the incidence end face 43a and the emission end face 43b are the same surface, and thus the distance traveled by wavelength converted light inside the wavelength conversion member 43 can be made short, scattering or reabsorption of excitation light inside the wavelength conversion member 43 can be prevented and also heat generation accompanying scattering or reabsorption can be prevented.

Also in the present embodiment, the extraction efficiency of extracting wavelength converted light from excitation light can be improved by making the incidence end face 43a and the emission end face 43b the same surface.

Also in the present embodiment, excitation light can reliably be reflected by the optical element 41 toward the wavelength conversion member 43 without the excitation light being leaked by keeping a desired distance between the optical element 41 and the wavelength conversion member 43 so that the substantially entire surface of the wavelength conversion member 43 can be irradiated with the excitation light. That is, according to the present embodiment, the spread angle of excitation light can easily be made wider by keeping a desired distance between the optical element 41 and the wavelength conversion member 43 so that the wavelength conversion member 43 can be irradiated with excitation light in a wide range. Accordingly, in the present embodiment, the amount of irradiated light of excitation light per unit area, that is, the density of excitation light on the incidence end face 43a of the wavelength conversion member 43 can be made small so that desired optical characteristics can be gained.

Also in the present embodiment, the substantially entire surface of the wavelength conversion member 43 is irradiated with excitation light, and thus the decline of wavelength conversion efficiency of the wavelength conversion member 43 occurs. In the present embodiment, however, if the upper limit of the density of excitation light is the same, the wavelength conversion member 43 can be irradiated with more excitation light than when a portion of the wavelength conversion member 43 is irradiated with excitation light so that the light source device 1 of higher output can be provided.

Also in the present embodiment, excitation light and wavelength converted light can be reflected in a wider range for the wavelength conversion member 43 by disposing the optical element 41 on the same plane as the emission opening portion 45 and disposing the emission opening portion 45 at the farthest position from the emission end face 20b. Accordingly, in the present embodiment, as described above, the amount of irradiated light of excitation light per unit area, that is, the density of excitation light on the incidence end face 43a of the wavelength conversion member 43 can be made small. As a result, in the present embodiment, the rise of temperature only in a portion of the wavelength conversion member 43 can be prevented and also the rise of temperature of the wavelength conversion member 43 as a whole can be prevented. Accordingly, in the present embodiment, the light source device 1 can gain desired optical characteristics.

Also in the present embodiment, the optical element 41 can be irradiated with excitation light without the excitation light being leaked by opposing the reflecting surface 41b to the emission end face 20b and disposing the center axis 41a of the optical element 41 on the optical axis 20c.

Also in the present embodiment, the whole optical element 41 can efficiently be irradiated with excitation light emitted from the optical fiber 20 by calculating the radius Rr of the optical element 41 according to Formulas (1), (2). Also in the present embodiment, the optical element 41 can be prevented from uselessly increasing in size and the wavelength conversion unit 40 can be made small in size.

Also in the present embodiment, excitation light can be made to efficiently enter the optical fiber 20 by adopting a multimode fiber for the optical fiber 20.

Figure 4:
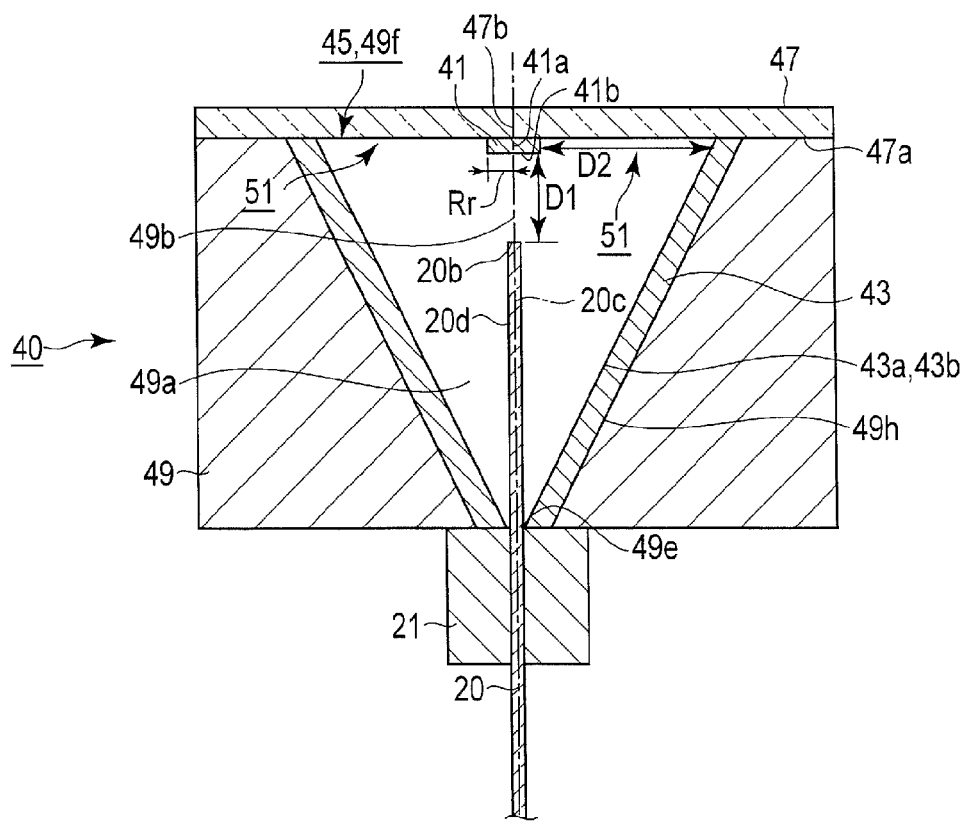
FIG. 4 is a diagram showing the internal configuration of a wavelength conversion unit according to a modification of the first embodiment.

Next, a modification of the first embodiment will be described with reference to FIG. 4.

One end 20d (end on the side of an emission end face 20b) of an optical fiber 20 in the present modification is inserted through a hole portion 49e and the emission end face 20b is disposed inside (through hole portion 49a) a holding member 49. Thus, a distance D1 in the present modification is shorter than the distance D1 in the first embodiment. Also, the distance D1 in the present modification is shorter than a distance D2 from a wavelength conversion member 43 to an optical element 41 in an emission opening portion 45 where the optical element 41 is disposed. Because the distance D1 in the present modification is shorter than the distance D1 in the first embodiment, according to Formula (1), a radius Rr in the present modification is shorter than the radius Rr in the first embodiment. That is, the optical element 41 in the present modification is smaller than the optical element 41 in the first embodiment and a transmission region 51 in the present modification is larger than the transmission region 51 in the first embodiment.

Because the one end 20d is inserted through the hole portion 49e, the wavelength conversion member 43 is disposed so as to surround the optical fiber 20.

Thus, according to the present modification, the distance D1 can be made shorter than that in the first embodiment by disposing the emission end face 20b inside the through hole portion 49a so that the optical element 41 can be made smaller. As a result, according to the present modification, the transmission region 51 can be made larger than in the first embodiment and the same effect as in the first embodiment can be obtained, and further, an object can be illuminated with more wavelength converted light.

Next, a second embodiment according to the present invention will be described with reference to FIG. 5. A duplicate description is omitted by attaching the same reference numerals to the same structural elements as those in the first embodiment.

A holding member 49 and a wavelength conversion member 43 in the present embodiment are, for example, flat plates in a circular shape, that is, discs. The holding member 49 and the wavelength conversion member 43 are disposed in a direction perpendicular to an optical axis 20c. The holding member 49 and the wavelength conversion member 43 have the same size each other. The holding member 49 and the wavelength conversion member 43 include respective opening portions 49j, 43d through which excitation light passes. These opening portions 49j, 43d are disposed on the optical axis 20c and are as large as an emission end face 20b or larger than the emission end face 20b. A ferrule 21 is disposed on one end face 49k of the holding member 49 in a similar manner to the emission end face 20b being disposed in the opening portion 49j. Another end face 49l of the holding member 49 is an end face disposed on the forward side from the end face 49k in a traveling direction of excitation light. The wavelength conversion member 43 is disposed in a region of the end face 49l excluding the opening portion 49j. That is, the wavelength conversion member 43 is disposed on the end face 49l in such a way that the opening portion 49j and the opening portion 43d are communicatively connected without a gap being provided each other.

As described above, the holding member 49 includes the opening portion 49j in which the emission end face 20b of the optical fiber 20 is disposed. The opening portion 49j is dispose on the optical axis 20c. Excitation light pass through the opening portion 49j. The holding member 49 holds the wavelength conversion member 43 in a region of the end face 49l excluding the opening portion 49j on the forward side in the traveling direction of excitation light.

Also, a transmission member 55 in a cylindrical shape is disposed on the wavelength conversion member 43. The diameter of the transmission member 55 is substantially the same as that of the wavelength conversion member 43. The transmission member 55 is formed of, for example, glass or an optical resin and allows excitation light and wavelength converted light to transmit through. Thus, an emission opening portion 45 in the present embodiment is formed on the entire surface (a top surface 55a and a side surface 55b) of the transmission member 55.

A reflecting optical element 41 having a disc shape is disposed on the transmission member 55. A center axis 41a as the center of a reflecting surface 41b of the optical element 41 is disposed on the optical axis 20c, the reflecting surface 41b is opposed to the emission end face 20b, and the reflecting surface 41b is also opposed to the wavelength conversion member 43. The optical element 41 is disposed on the transmission member 55 so as to be in contact with, for example, the top surface 55a. Thus, the transmission member 55 is disposed between the optical element 41 and the wavelength conversion member 43, instead of a space (the inside of a through hole portion 49a) like in the first embodiment. A desired distance is kept between the optical element 41 and the wavelength conversion member 43 by the transmission member 55. In other words, the transmission member 55 keeps a desired distance between the optical element 41 and the wavelength conversion member 43 by being disposed between the optical element 41 and the wavelength conversion member 43. Incidentally, the diameter of the optical element 41 is smaller than that of the transmission member 55.

The transmission member 55 also includes a transmission region 51. The transmission region 51 in the present embodiment indicates a region of the transmission member 55 where the optical element 41 is not disposed on the top surface 55a and the side surface 55b of the transmission member 55. The transmission region 51 is also the emission opening portion 45 of a wavelength conversion unit 40 through which wavelength converted light is emitted to the outside of the wavelength conversion unit 40.

That is, the emission opening portion 45 in the present embodiment includes the transmission region 51 on the surface (the top surface 55a and the side surface 55b) of the transmission member 55 excluding the optical element 41. Thus, the transmission region 51 indicates a region of the emission opening portion 45 (transmission member 55) where the optical element 41 is not disposed, more specifically, a region inside the emission opening portion 45 and outside the optical element 41.

Because the optical element 41 is disposed on the transmission member 55, the optical element 41 is disposed on the same surface as the emission opening portion 45 of the wavelength conversion unit 40.

The center axis 41a of the optical element 41, a center axis 55c of the transmission member 55, the center of the wavelength conversion member 43, the center of the holding member 49, and the centers of the opening portions 43d, 49j are disposed on the optical axis 20c.

The reflecting surface 41b of the optical element 41, the top surface 55a and a bottom surface 55d of the transmission member 55, the wavelength conversion member 43 including an incidence end face 43a and an emission end face 43b, and one end face 49k and another end face 49l of the holding member 49 are formed on planes perpendicular to the optical axis 20c.

By adopting the above configuration, the shape of a beam spot of excitation light emitted from the optical fiber 20 is substantially circular both on the reflecting surface 41b of the optical element 41 and the wavelength conversion member 43.

Now, the distance from the emission end face 20b of the optical fiber 20 to the optical element 41 is set as D1, the distance from the optical element 41 to the wavelength conversion member 43 is set as D3, the numerical aperture of the optical fiber 20 is set as NA, and the index of refraction of the transmission member 55 is set as nt. In this case, a radius Rr of the optical element 41 and a radius Rw of the wavelength conversion member 43 can be calculated according to Formulas (3), (4) shown below:

$$Rr = D1 \times \tan(\phi) \quad \text{Formula (3)}$$

$$Rw = (D1+D3) \times \tan(\phi) \quad \text{Formula (4)}$$

The angle ($\phi$) is a spread angle of excitation light emitted from the emission end face 20b and can be calculated according to Formula (5) shown below:

$$\phi = \arcsin(NA/nt) \quad \text{Formula (5)}$$

In the present embodiment, the outside diameter of the optical element 41 is formed so as to be substantially equal to that of a beam spot (excitation light irradiation region) of excitation light according to Formulas (3), (5). The beam spot of excitation light is formed on the reflecting surface 41b of the optical element 41 when excitation light emitted from the emission end face 20b of the optical fiber 20 travels toward the optical element 41 while spreading at the spread angle in accordance with the numerical aperture NA of the optical fiber 20 and the index of refraction nt of the transmission member 55.

By adopting the above configuration, the size of the reflecting surface 41b and the size of excitation light irradiated with the reflecting surface 41b are made to substantially match each other and almost all excitation light emitted from the emission end face 20b is irradiated with the optical element 41 (reflecting surface 41b).

In the present embodiment, the outside diameter of the wavelength conversion member 43 is formed so as to be substantially equal to that of a beam spot (excitation light irradiation region) of excitation light according to Formulas (4), (5). The beam spot of excitation light is formed on the wavelength conversion member 43 when the excitation light reflected by the optical element 41 travels toward the wavelength conversion member 43 while spreading at the spread angle in accordance with the numerical aperture NA of the optical fiber 20 and the index of refraction nt of the transmission member 55.

By adopting the above configuration, the size of the wavelength conversion member 43 and the size of excitation light irradiated with the wavelength conversion member 43 are made to substantially match each other and almost all excitation light emitted from the optical fiber 20 is reflected by the optical element 41 and transmitted through the transmission member 55 to irradiate with the wavelength conversion member 43. Because of the configuration to make the wavelength conversion member 43 and a beam spot of excitation light formed on the wavelength conversion member 43 substantially equal each other, almost the entire surface of the wavelength conversion member 43 is formed as an extraction surface of wavelength converted light, that is, as the emission end face 43b of wavelength converted light.

Next, the operation method in the present embodiment will be described.

The operation from the emission of excitation light from an excitation light source 10 until the excitation light incidents the wavelength conversion unit 40 is the same as that in the first embodiment, and thus the description thereof is omitted.

After being emitted from the emission end face 20b of the optical fiber 20, the excitation light passes the opening portions 49j, 43d to enter the transmission member 55.

The excitation light having incidented the transmission member 55 transmits through the transmission member 55 toward the optical element 41 while spreading at the spread angle in accordance with the numerical aperture NA of the optical fiber 20 and the index of refraction nt of the transmission member 55 to irradiate with the optical element 41.

At this point, the excitation light irradiated with the optical element 41 forms a beam spot on the reflecting surface 41b of the optical element 41. Thanks to the distance D1 and the radius Rr calculated based on Formulas (3), (5), the outside diameter of the beam spot is formed so as to be substantially equal to that of the optical element 41. Thus, most of the excitation light emitted from the emission end face 20b of the optical fiber 20 irradiates with the optical element 41 (reflecting surface 41b).

The excitation light having irradiated with the optical element 41 is reflected by the reflecting surface 41b of the optical element 41 to transmit through the transmission member 55 again.

At this point, the excitation light transmits through the transmission member 55 toward the wavelength conversion member 43 while spreading at the spread angle in accordance with the numerical aperture NA of the optical fiber 20 and the index of refraction nt of the transmission member 55 to irradiate with the wavelength conversion member 43.

At this point, the excitation light irradiating with the wavelength conversion member 43 forms a beam spot on the wavelength conversion member 43. Thanks to the distances D1, D3 and the radius Rw calculated based on Formulas (4), (5), the outside diameter of the beam spot is formed so as to be substantially equal to that of the wavelength conversion member 43. Thus, most of the excitation light reflected by the optical element 41 (reflecting surface 41b) irradiates with the wavelength conversion member 43.

The excitation light having irradiated with the wavelength conversion member 43 incidents the wavelength conversion member 43 through the incidence end face 43a and is gradually absorbed by the wavelength conversion member 43 while traveling inside before being converted into wavelength converted light.

Thus, like in the first embodiment, a portion of wavelength converted light changes to heat accompanying scattering or reabsorption. Also like in the first embodiment, the other portion of the wavelength converted light travels inside the wavelength conversion member 43 and is emitted to the outside by scattering or the like or reabsorbed by the wavelength conversion member 43 to become secondary wavelength converted light having a longer wavelength.

The process as described above is repeated and a portion of wavelength converted light transmits through the transmission region 51 directly or via various processes and is emitted from the wavelength conversion unit 40 to illuminate an object as illumination light.

Thus, according to the present embodiment, the same effect as in the first embodiment can be obtained, and further, the structure of the wavelength conversion unit 40 can be simplified so that the wavelength conversion unit 40 can be created more easily.

Also in the present embodiment, a desired distance can reliably be kept between the optical element 41 and the wavelength conversion member 43 by the transmission member 55 and excitation light can reliably be reflected by the optical element 41 toward the wavelength conversion member 43 without the excitation light being leaked, so that the substantially entire surface of the wavelength conversion member 43 can be irradiated with the excitation light. That is, according to the present embodiment, the spread angle of excitation light can easily be made wider by keeping a desired distance between the optical element 41 and the wavelength conversion member 43 by the transmission member 55 so that the wavelength conversion member 43 can be irradiated with excitation light in a wider range. Accordingly, in the present embodiment, the amount of irradiated light of excitation light per unit area, that is, the density of excitation light on the incidence end face 43a of the wavelength conversion member 43 can be made small so that the light source device 1 can gain desired optical characteristics.

Further, in the present embodiment, the transmission region 51 can easily be made larger than in the first embodiment by the transmission member 55, and thus, in addition to the effect like in the first embodiment, more wavelength converted light can be emitted to the outside of the wavelength conversion unit 40 so that the light source device 1 of higher output can be provided.

Next, a third embodiment according to the present invention will be described with reference to FIG. 6. A duplicate description is omitted by attaching the same reference numerals to the same structural elements as those in the first embodiment.

A reflecting optical element 41 in the present embodiment has a conical shape and a reflecting surface 41b thereof is formed on a conical surface of the cone. A vertex 41d of the cone is disposed inside a through hole portion 49a. The vertex 41d and a center 41f of a bottom surface 41e of the optical element 41, that is, a center axis 41a of the optical element 41 is disposed on an optical axis 20c. The bottom surface 41e of the optical element 41 is disposed in an emission opening portion 45 of a wavelength conversion unit 40 and is perpendicular to the optical axis 20c.

The reflecting surface 41b protrudes toward an emission end face 20b of the optical fiber 20 and is disposed rotationally symmetrically with the optical axis 20c set as a rotation axis. The reflecting surface 41b is inclined with respect to the optical axis 20c, forming an inclined plane.

The angle of inclination of the reflecting surface 41b is such an angle that when excitation light emitted from the emission end face 20b of the optical fiber 20 is regularly reflected by the reflecting surface 41b, the excitation light irradiates with a wavelength conversion member 43 near the emission opening portion 45.

The angle of inclination of the reflecting surface 41b is also such an angle that when excitation light emitted from the emission end face 20b of the optical fiber 20 is regularly reflected by the reflecting surface 41b, the excitation light is not emitted from the emission opening portion 45 of the wavelength conversion unit 40 to the outside of the wavelength conversion unit 40.

Now, the numerical aperture of the optical fiber 20 is set as NA, the index of refraction of the space (inside a through hole portion 49a) between the emission end face 20b of the optical fiber 20 and the optical element 41 is set as nt (here, nt=1), the maximum angle between an emission direction of excitation light emitted from the emission end face 20b of the optical fiber 20 toward the reflecting surface 41b and the optical axis 20c is set as an angle $\phi$, and the angle formed between the reflecting surface 41b of the optical element 41 and the optical axis 20c is set as an inclination angle $\alpha$.

That is, if the contact point of the bottom surface 41e and the reflecting surface 41b is a contact point 41g, the angle $\phi$ is an angle between the straight line connecting the emission end face 20b and the contact point 41g and the optical axis 20c.

In this case, the angle $\phi$ and the inclination angle $\alpha$ are calculated according to Formulas (6), (7) shown below:

$$\phi = \arcsin(NA/nt) \quad \text{Formula (6)}$$

$$\alpha \geq \pi/4 + \phi/2 \quad \text{Formula (7)}$$

Thus, if the angle formed between the traveling direction (straight line connecting the emission end face 20b and the contact point 41g) of excitation light emitted at the angle $\phi$ and the traveling direction of the excitation light reflected by the reflecting surface 41b is $\beta$ regarding the traveling direction of the excitation light reflected by the reflecting surface 41b of the optical element 41 when the excitation light emitted from the emission end face 20b at the angle $\phi$ is reflected by the reflecting surface 41b of the optical element 41 to irradiate with the wavelength conversion member 43, the angle $\beta$ is larger than $\pi/2$.

In the present embodiment, excitation light emitted from the emission end face 20b travels toward the optical element 41 while spreading at the spread angle in accordance with the numerical aperture NA of the optical fiber 20 and the index of refraction nt (here, nt=1). At this point, the excitation light emitted at the angle $\phi$ is regularly reflected by the reflecting surface 41b to travel to the side of the emission end face 20b rather than the plane containing the bottom surface 41e according to Formulas (6), (7). That is, the excitation light travels so as to irradiate with the wavelength conversion member 43 near the emission opening portion 45 and not to be emitted from the emission opening portion 45 to the outside of the wavelength conversion unit 40.

Next, the operation method in the present embodiment will be described.

The operation from the emission of excitation light from an excitation light source 10 until the excitation light incidents the wavelength conversion unit 40 is the same as that in the first embodiment, and thus the description thereof is omitted.

After being emitted from the emission end face 20b of the optical fiber 20 at the angle $\phi$, the excitation light travels inside the through hole portion 49a while spreading at the spread angle in accordance with the numerical aperture NA of the optical fiber 20 and the index of refraction nt (here, nt=1) of the space between the emission end face 20b of the optical fiber 20 and the optical element 41.

At this point, the excitation light is regularly reflected by the reflecting surface 41b of the optical element 41 to travel to the side of the emission end face 20b of the optical fiber 20 rather than the plane containing the bottom surface 41e of the optical element 41 according to Formulas (6), (7). That is, the excitation light is not emitted from the emission opening portion 45 of the wavelength conversion unit 40 to the outside of the wavelength conversion unit 40. Then, the excitation light irradiates with the wavelength conversion member 43 near the emission opening portion 45 of the wavelength conversion unit 40.

Thus, excitation light is emitted from the emission end face 20b of the optical fiber 20 and is reflected by the optical element 41 to irradiate with the wavelength conversion member 43 near the emission opening portion 45 of the wavelength conversion unit 40 inside the through hole portion 49a without being emitted from the emission opening portion 45 of the wavelength conversion unit 40 to the outside of the wavelength conversion unit 40.

The subsequent operation is substantially the same as that in the first embodiment, and thus the description thereof is omitted.

Thus, in the present embodiment, the reflecting surface 41b is protruded toward the emission end face 20b, the reflecting surface 41b is disposed rotationally symmetrically with the optical axis 20c set as a rotation axis, and the reflecting surface 41b is inclined with respect to the optical axis 20c. Also in the present embodiment, the reflecting surface 41b is formed on a conical surface. Accordingly, in the present embodiment, excitation light can be irradiated with not only the wavelength conversion member 43 near the hole portion 49e, but also the wavelength conversion member 43 near the emission opening portion 45 of the wavelength conversion unit 40. Thus, in the present embodiment, heat generation accompanying wavelength conversion can distributed over a wider range than in the first embodiment. Also in the present embodiment, partial heating of the wavelength conversion member 43 can be reduced more than in the first embodiment.

Also in the present embodiment, the neighborhood of the emission opening portion 45 of the wavelength conversion unit 40 can be irradiated with excitation light and therefore, wavelength converted light generated near the emission opening portion 45 of the wavelength conversion unit 40 can be emitted to the outside of the wavelength conversion unit 40 without being blocked by the optical element 41 or the like. Accordingly, in the present embodiment, the extraction efficiency of extracting wavelength converted light from excitation light can be improved.

The optical element 41 has a circular shape in the first embodiment, and thus excitation light emitted along the optical axis 20c is regularly reflected by the optical element 41 to return to the emission end face 20b of the optical fiber 20. Accordingly, there arises a possibility that excitation light is not irradiate with the wavelength conversion member 43 so that the excitation light is not converted into wavelength conversion light. Accordingly, there arises a possibility that the extraction efficiency of extracting wavelength converted light from excitation light declines.

In the present embodiment, however, the optical element 41 has a conical shape and the vertex 41d of the cone is disposed on the optical axis 20c. Accordingly, in the present embodiment, excitation light can be reflected to the wavelength conversion member 43 near the emission opening portion 45 of the wavelength conversion unit 40 by the excitation light being emitted toward the vertex 41d. Thus, in the present embodiment, the amount of return excitation light returning to the emission end face 20b of the optical fiber 20 can be reduced when compared with the first embodiment so that the extraction efficiency of extracting wavelength converted light from excitation light can be improved.

Also in the present embodiment, excitation light can be prevented from being emitted from the emission opening portion 45 to the outside of the wavelength conversion unit 40 according to Formulas (6), (7).

The optical element 41 is formed in a conical shape in the present embodiment, but the shape thereof is not limited to the conical shape. As a modification, for example, as shown in FIG. 7, an optical element 41 may have a shape obtained by cutting off a portion of a sphere. In this case, the reflecting surface 41b is formed as a curved surface of a sphere. Accordingly, in the present modification, excitation light can be irradiated with a wider region of a wavelength conversion member 43 so that partial heating can be reduced.

Now, the cut surface of a sphere of the optical element 41 is set as a bottom surface 41e and the contact point of the bottom surface 41e and the reflecting surface 41b is set as a contact point 41j. Also, the angle formed between a straight line 41m connecting the contact point 41j and a portion of the reflecting surface 41b and an optical axis 20c is set as an inclination angle α. The inclination angle α is set in such a way that when excitation light travels inside a through hole portion 49a while spreading at the spread angle in accordance with the numerical aperture NA of the optical fiber 20 and the index of refraction nt of the space between an emission end face 20b of the optical fiber 20 and the optical element 41 and is reflected at the contact point 41j, the excitation light travels in a direction perpendicular to the optical axis 20c. Accordingly, the excitation light is not emitted from the emission opening portion 45 of the wavelength conversion unit 40 to the outside of the wavelength conversion unit 40. Thus, in the present modification, excitation light can be prevented from being emitted from the emission opening portion 45 to the outside of the wavelength conversion unit 40.

Next, a fourth embodiment according to the present invention will be described with reference to FIG. 8. A duplicate description is omitted by attaching the same reference numerals to the same structural elements as those in the first embodiment.

In the present embodiment, instead of the reflecting optical element 41 in the first embodiment, a wavelength selective reflection film (hereinafter, a reflection film 59) that reflects a desired wavelength and allows a different desired wavelength to transmit through is disposed.

The reflection film 59 is, for example, an optical element that reflects excitation light emitted from an emission end face 20b of an optical fiber 20 and allows wavelength converted light whose wavelength has been converted by a wavelength conversion member 43 to transmit through. The reflection film 59 is flat. The reflection film 59 is formed by a plurality of thin films being stacked. These thin films each have mutually different indexes of refraction and thicknesses. Such thin films are, for example, a coated dielectric multilayer film. In the reflection film 59, the period and the index of refraction of dielectric layers are adjusted to desired values so that laser light as excitation light is reflected by the reflection film 59 and wavelength converted light emitted from the wavelength conversion member 43 transmits through the reflection film 59.

The reflection film 59 is held by a transparent retainer plate 47 so as to be disposed on the entire surface of the emission opening portion 45 of the wavelength conversion unit 40. That is, the reflection film 59 is disposed in an entire large hole portion 49f of a through hole portion 49a and has a circular shape. The reflection film 59 described above is opposed to the emission end face 20b of the optical fiber 20. A center 59a of the reflection film 59 is disposed on an optical axis 20c.

The reflection film 59 includes a transmission region 51 to transmit through for wavelength converted light to be emitted to the outside of the wavelength conversion unit 40. In this case, the transmission region 51 is the emission opening portion 45 of the wavelength conversion unit 40 and the entire surface of the reflection film 59.

Next, the operation method in the present embodiment will be described.

The operation from the emission of excitation light from an excitation light source 10 until the excitation light enters the wavelength conversion unit 40 is the same as that in the first embodiment, and thus the description thereof is omitted.

After indicating the wavelength conversion unit 40, excitation light travels inside the through hole portion 49a while spreading at the spread angle in accordance with the numerical aperture NA of the optical fiber 20 to irradiate with the reflection film 59 before being reflected by the reflection film 59.

The excitation light reflected by the reflection film 59 travels toward the wavelength conversion member 43 disposed on an inner circumferential surface 49h of the through hole portion 49a while spreading at the spread angle in accordance with the numerical aperture NA of the optical fiber 20 to irradiate with the wavelength conversion member 43.

The excitation light having irradiated with the wavelength conversion member 43 incidents the wavelength conversion member 43 through the incidence end face 43a and is gradually absorbed by the wavelength conversion member 43 while traveling inside before being converted into wavelength converted light.

The wavelength converted light is emitted in various directions from the substantially entire surface (emission end face 20b) of the wavelength conversion member 43 without being affected by the incidence direction of excitation light. At this point, a portion of the wavelength converted light travels inside the through hole portion 49a. The other portion of the wavelength converted light travels inside the wavelength conversion member 43 and is emitted to the outside by scattering or the like or reabsorbed by the wavelength conversion member 43 to become secondary wavelength converted light having a longer wavelength.

The portion of the wavelength converted light traveling inside the through hole portion 49a travels toward the reflection film 59 and transmits through the reflection film 59 (transmission region 51) without being reflected by the reflection film 59 before being emitted from the wavelength conversion unit 40 to irradiate with an object as illumination light.

Excitation light reflected or scattered by the wavelength conversion member 43 without being wavelength-converted by the wavelength conversion member 43 travels inside the through hole portion 49a toward the reflection film 59 to irradiate with the reflection film 59 again. The reflection film 59 reflects the excitation light again toward the wavelength conversion member 43.

That is, only wavelength converted light wavelength-converted by the wavelength conversion member 43 is emitted from the wavelength conversion unit 40 as illumination light. Excitation light reflected or scattered by the wavelength conversion member 43 without being wavelength-converted by the wavelength conversion member 43 is reflected by the reflection film 59 toward the wavelength conversion member 43.

Thus, in the present embodiment, wavelength converted light can be emitted from the entire surface of the emission opening portion 45 of the wavelength conversion unit 40 by disposing the reflection film 59 on the entire surface of the emission opening portion 45 while maintaining the basic structure of the first embodiment. Accordingly, in the present embodiment, a light source device 1 having desired optical characteristics such as being brighter and being able to emit wavelength converted light without being blocked, in addition to the same effect as in the first embodiment, can be provided.

Also in the present embodiment, the reflection film 59 is disposed on the entire surface of the emission opening portion 45, and thus the need for axis alignment of the reflection film 59, the optical axis 20c, and a center axis of the optical fiber 20 can be eliminated so that the wavelength conversion unit 40 can be created more easily.

Figure 9:
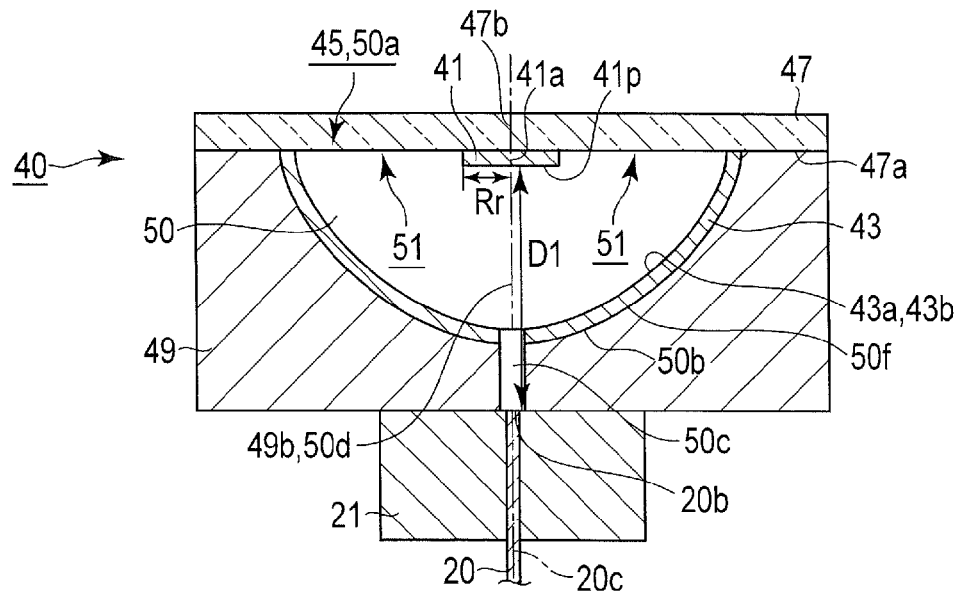
FIG. 9 is a diagram showing the internal configuration of a wavelength conversion unit according to a fifth embodiment.

Next, a fifth embodiment according to the present invention will be described with reference to FIG. 9. A duplicate description is omitted by attaching the same reference numerals to the same structural elements as those in the first embodiment.

In the present embodiment, instead of the reflecting optical element 41 in the first embodiment, a scattering optical element 41 is disposed. The optical element 41 includes a scattering surface 41p that scatters excitation light and wavelength converted light. The scattering surface 41p indicates the entire surface of the optical element 41 on the side of an emission end face 20b. The scattering surface 41p is opposed to the emission end face 20b.

The optical element 41 (scattering surface 41p) scatters excitation light emitted from the emission end face 20b of an optical fiber 20 and wavelength converted light emitted from a wavelength conversion member 43 in a random direction, that is, a desired direction. The optical element 41 is, for example, a flat plate coated with powder having a desired reflectance or a member having a desired index of refraction and minute irregularities in various shapes formed thereon. Naturally, the optical element 41 is not limited to such examples and only needs to be able to scatter excitation light and wavelength converted light.

Like in the first embodiment, the optical element 41 is held by a transparent retainer plate 47 so as to be disposed on the same surface as an emission opening portion 45 of a wavelength conversion unit 40. The optical element 41 has, for example, a circular shape. A center axis 41a of the optical element 41 is disposed on an optical axis 20c.

In the present embodiment, the outside diameter of the optical element 41 is formed so as to be substantially equal to that of a beam spot (excitation light irradiation region) of excitation light according to Formulas (1), (2) described above. The beam spot of excitation light is formed on the scattering surface 41p of the optical element 41 when excitation light emitted from the emission end face 20b of the optical fiber 20 travels toward the optical element 41 while spreading at the spread angle in accordance with the numerical aperture NA of the optical fiber 20.

A holding member 49 in the present embodiment has a concave shape and an inner circumferential surface 50f of a recess portion 50 of the holding member 49 has a semispherical shape. A center axis 49b of the holding member 49 is disposed on the optical axis 20c.

An opening portion 50a side on the upper end side of the recess portion 50 is disposed on the side of the transparent retainer plate 47. The opening portion 50a becomes the emission opening portion 45 of a wavelength conversion unit 40 through which wavelength converted light is emitted to the outside of the wavelength conversion unit 40. The optical element 41 also scatters, as described above, wavelength converted light. Thus, in the present embodiment, the emission opening portion 45 includes a transmission region 51 in a region obtained by excluding a region where the optical element 41 is disposed from the emission opening portion 45. Thus, the transmission region 51 indicates a region of the emission opening portion 45 where the optical element 41 is not disposed, more specifically, a region inside the emission opening portion 45 and outside the optical element 41.

A bottom surface 50b of the recess portion 50 is disposed on the side of the emission end face 20b. The bottom surface 50b has an opening portion 50c through which excitation light emitted from the emission end face 20b passes at a bottom point.

Thus, the recess portion 50 has the opening portions 50a, 50c and so is a through hole portion having a portion of a sphere. Incidentally, the recess portion 50 may have, like in the first embodiment, a truncated conical shape whose diameter increases from the bottom surface 50b toward the opening 50a.

The wavelength conversion member 43 is disposed on the inner circumferential surface 50f of the spherical recess portion 50 of the holding member 49. The wavelength conversion member 43 is disposed on the inner circumferential surface 50f excluding the opening portion 50c.

Incidentally, the holding member 49 may have a truncated conical shape whose diameter increases from the bottom surface 50b toward the opening portion 50c.

A center axis 50d of the recess portion 50 and the center axis 41a of the optical element 41 are disposed on the optical axis 20c each other.

The emission end face 20b of the optical fiber 20 is disposed inside the recess portion 50 or near the opening portion 50c so as to be opposed to the optical element 41.

The operation of the present embodiment will be described.

The operation from the emission of excitation light from an excitation light source 10 until the excitation light incidences the wavelength conversion unit 40 is the same as that in the first embodiment, and thus the description thereof is omitted.

After being emitted from the emission end face 20b of the optical fiber 20, excitation light passes the opening portion 50c of the holding member 49 and travels inside the recess 50 toward the optical element 41 while spreading at the spread angle in accordance with the numerical aperture NA of the optical fiber 20 to irradiate with the optical element 41 (scattering surface 41p).

At this point, the excitation light irradiating with the optical element 41 forms a beam spot on the scattering surface 41p of the optical element 41. Thanks to the distance D1 and the radius Rr calculated based on Formulas (1), (2), the outside diameter of the beam spot is formed so as to be substantially equal to that of the optical element 41. Thus, most of the excitation light emitted from the emission end face 20b of the optical fiber 20 irradiates with the optical element 41 (scattering surface 41p).

The excitation light having irradiated with the optical element 41 is scattered by the scattering surface 41p of the optical element 41 and travels toward the wavelength conversion member 43 by spreading to the whole inner circumferential surface 50f of the recess portion 50 to irradiate with the substantially entire surface of the wavelength conversion member 43.

The general scattering surface 41p scatters excitation light in such a way that the intensity distribution (amount of light, irradiation intensity) of the excitation light becomes stronger in a direction (opening portion 50c side) in which the excitation light is regularly reflected and further becomes weaker in a direction toward the periphery of the direction (for example, a direction perpendicular to the optical axis 20c).

Thus, in the present embodiment, the intensity distribution of excitation light becomes stronger near the opening 50c and becomes weaker in a direction toward the periphery (for example, an edge of the emission opening portion 45). Even in such a case, however, the scattered excitation light irradiates with, as a result, on the substantially entire surface of the wavelength conversion member 43 disposed on the inner circumferential surface 50f of the recess portion 50.

The excitation light having irradiated with the wavelength conversion member 43 incidences the wavelength conversion member 43 through the incidence end face 43a and is gradually absorbed by the wavelength conversion member 43 while traveling inside before being converted into wavelength converted light.

The subsequent operation is substantially the same as that in the first embodiment, and thus the description thereof is omitted.

Thus, in the present embodiment, the same effect as in the first embodiment can be obtained even if excitation light is scattered by the scattering optical element 41.

Also in the present embodiment, a wider region of the wavelength conversion member 43 can be irradiated with excitation light by disposing the wavelength conversion member 43 on the whole inner circumferential surface 50f of the recess portion 50 and scattering the excitation light. Accordingly, in the present embodiment, the rise of temperature only in a portion of the wavelength conversion member 43 can be prevented and also the rise of temperature of the wavelength conversion member 43 as a whole can be prevented. Accordingly, in the present embodiment, desired optical characteristics can be gained.

That is, according to the present embodiment, the wavelength conversion member 43 can be irradiated with excitation light more uniformly so that a partial increase in density of excitation light in the wavelength conversion member 43 can be made smaller. Accordingly, in the present embodiment, if the upper limit of the density of excitation light is the same, the wavelength conversion member 43 can be irradiated with more excitation light than when a portion of the wavelength conversion member 43 is irradiated with excitation light so that the light source device 1 of higher output can be provided.

Also in the present embodiment, the wavelength conversion member 43 near the transmission region 51 is also irradiated with excitation light by the optical element 41 (scattering) and compared with a case when excitation light is reflected, the extraction efficiency of extracting wavelength converted light from excitation light can be improved.

Figure 10:
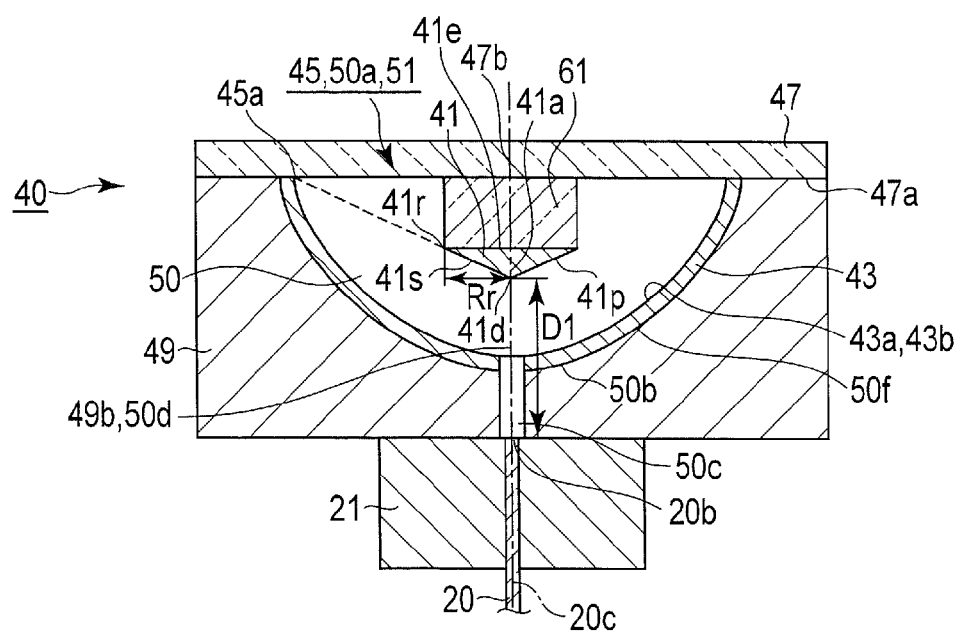
FIG. 10 is a diagram showing the internal configuration of a wavelength conversion unit according to a modification of the fifth embodiment.

Next, a modification of the fifth embodiment will be described with reference to FIG. 10.

A scattering optical element 41 in the present modification disposed on an end face 47a of a transparent retainer plate 47 via a mounting member 61.

The mounting member 61 is formed of, for example, glass. Wavelength converted light transmits through the mounting member 61. The mounting member 61 is disposed on the end face 47a so as to be set up toward an inner circumferential surface 50f of a recess portion 50. The mounting member 61 has, for example, a cylindrical shape.

The scattering optical element 41 in the present embodiment is disposed inside a wavelength conversion unit 40 on the side of an emission end face 20b of an optical fiber 20 than an emission opening portion 45 via the mounting member 61, that is, inside the recess portion 50. Thus, the optical element 41 is closer to the emission end face 20b of the optical fiber 20 than in the fifth embodiment.

The optical element 41 has a conical shape and a vertex 41d of the cone is disposed inside the recess portion 50. The optical element 41 includes a center axis 41a passing through the vertex 41d of the cone and the center of a bottom surface 41e of the optical element 41. The center axis 41a is disposed on an optical axis 20c.

A scattering surface 41p is formed on a conical surface of a cone, protrudes toward the emission end face 20b of the optical fiber 20 and, is disposed rotationally symmetrically with the optical axis 20c set as a rotation axis. The scattering surface 41p is inclined with respect to the optical axis 20c, that is, an inclined plane is formed.

An extension line of a straight line 41s on the inclined plane connecting the vertex 41d to an edge 41r on the side of the bottom surface 41e of the optical element 41 abuts on an edge 45a of the emission opening portion 45 of the wavelength conversion unit 40. The inclined plane has such an inclination.

The optical element 41 configured as described above is suited to intensive scattering in a direction in which excitation light is regularly reflected. The scattering surface 41p of the optical element 41 is an inclined plane, and thus compared with a flat plate, the neighborhood of the emission opening portion 45 of the wavelength conversion unit 40 can more easily be irradiated with excitation light.

The diameter of the bottom surface 41e of the optical element 41 is substantially the same as that of the mounting member 61. The diameter of the scattering surface 41p is formed so as to be substantially equal to the outside diameter of a beam spot (excitation light irradiation region) of excitation light. The beam spot of excitation light is formed on the scattering surface 41p of the optical element 41 when excitation light emitted from the emission end face 20b of the optical fiber 20 travels toward the optical element 41 while spreading at the spread angle in accordance with the numerical aperture NA of the optical fiber 20.

The whole emission opening portion 45 in the present modification is a transmission region 51 because the optical element 41 is disposed inside the recess portion 50 and the mounting member 61 allows wavelength converted light to transmit through.

The operation of the present modification will be described.

The operation from the emission of excitation light from an excitation light source 10 until the excitation light enters the wavelength conversion unit 40 is the same as that in the first embodiment, and thus the description thereof is omitted.

After being emitted from the emission end face 20b of the optical fiber 20, excitation light passes an opening portion 50c and travels inside the recess 50 toward the optical element 41 while spreading at the spread angle in accordance with a numerical aperture NA of the optical fiber 20 to irradiate with the optical element 41 (scattering surface 41p).

At this point, the excitation light irradiated with the optical element 41 forms a beam spot on the scattering surface 41p of the optical element 41. The outside diameter of the beam spot is formed so as to be substantially equal to that of the optical element 41. Thus, most of the excitation light emitted from the emission end face 20b of the optical fiber 20 irradiates with the optical element 41 (scattering surface 41p).

The excitation light having irradiate with the optical element 41 is scattered by the scattering surface 41p of the optical element 41 and travels toward the wavelength conversion member 43, spreading to the whole inner circumferential surface 50f of the recess portion 50 to irradiate with the substantially entire surface of the wavelength conversion member 43.

In the present modification, the optical element 41 is suited to intensive scattering in a direction in which excitation light is regularly reflected and the neighborhood of the emission opening portion 45 of the wavelength conversion unit 40 can more easily be irradiated with excitation light.

Also in the present modification, the optical element 41 is disposed inside the wavelength conversion unit 40 (inside the recess portion 50) and the extension line of the straight line 41s abuts on the edge 45a of the emission opening portion 45 of the wavelength conversion unit 40.

Thus, the excitation light scattered by the scattering surface 41p is not directly leaked out of the wavelength conversion unit 40. Then, the excitation light travels and spreads to the whole inner circumferential surface 50f of the recess portion 50 to irradiate with the substantially entire surface of the wavelength conversion member 43.

The excitation light having irradiated with the wavelength conversion member 43 incidences the wavelength conversion member 43 through the incidence end face 43a and is gradually absorbed by the wavelength conversion member 43 while traveling inside before being converted into wavelength converted light.

The subsequent operation is substantially the same as that in the first embodiment, and thus the description thereof is omitted.

Inside the recess portion 50 of the holding member 49, only the optical element 41 does not allow wavelength converted light to transmit through. Thus, the wavelength converted light is emitted to the outside of the wavelength conversion unit 40 via the mounting member 61, inside the recess portion 50 or the like.

According to the present modification, the same effect as in the first and fifth embodiments can be obtained. Also according to the present modification, a whole opening portion 50a as the emission opening portion 45 of the wavelength conversion unit 40 can be made in the transmission region 51 by disposing the optical element 41 inside the recess portion 50 through the mounting member 61. Accordingly, in the present embodiment, more wavelength converted light can be made to be emitted to the outside of the wavelength conversion unit 40 without being shielded by a shield member in the emission opening portion 45.

There is no need to limit the shape of the optical element 41 in the present modification to the conical shape and the shape thereof may be a circular shape. In the present modification, the same effect can be obtained by using the reflecting optical element 41 in a conical shape or a circular shape.

Incidentally, the present modification can be incorporated into the first, third, and fourth embodiments and respective modifications.

Next, a sixth embodiment according to the present invention will be described with reference to FIGS. 11 and 12. A duplicate description is omitted by attaching the same reference numerals to the same structural elements as those in the first embodiment.

Instead of the reflecting optical element 41 in the first embodiment, a diffractive optical element 41 is disposed. The optical element 41 includes a diffraction surface 41u that scatters excitation light and wavelength converted light. The diffraction surface 41u indicates the entire surface of the optical element 41 on the side of an emission end face 20b. The diffraction surface 41u is opposed to the emission end face 20b.

Like in the first embodiment, the optical element 41 is held by a transparent retainer plate 47 so as to be disposed on the same surface as an emission opening portion 45 of a wavelength conversion unit 40. The optical element 41 has, for example, a circular shape. A center axis 41a of the optical element 41 is disposed on an optical axis 20c.

In the present embodiment, the outside diameter of the optical element 41 is formed so as to be substantially equal to that of a beam spot (excitation light irradiation region) of excitation light according to Formulas (1), (2) described above. The beam spot of excitation light is formed on the diffraction surface 41u of the optical element 41 when excitation light emitted from the emission end face 20b of the optical fiber 20 travels toward the optical element 41 while spreading at the spread angle in accordance with the numerical aperture NA of the optical fiber 20.

As shown in FIG. 12, the optical element 41 (diffraction surface 41u) includes a reflecting region 41v that reflects (diffracts) excitation light and a non-reflecting region 41w that absorbs excitation light to prevent the leakage of the excitation light to the outside of the wavelength conversion unit 40.

As shown in FIG. 12, the component of excitation light traveling in a straight line in the emission direction is the largest in a center region 41x of the optical element 41, and thus it is desirable to adopt the reflecting region 41v in, for example, a circular shape to irradiate a wavelength conversion member 43 with the excitation light.

In this case, the non-reflecting region 41w in a hollow shape is disposed on an outer circumferential side of the reflecting region 41v in a circular shape. In other words, the reflecting region 41v in a circular shape is disposed in a hollow portion of the non-reflecting region 41w. The reflecting region 41v in a hollow shape is disposed on the outer circumferential side of the non-reflecting region 41w in a hollow shape. In other words, the non-reflecting region 41w is disposed in a hollow portion of the reflecting region 41v in a hollow shape.

The reflecting region 41v and the non-reflecting region 41w as described above are alternately disposed while being in close contact with each other in a radial direction of the optical element 41. Also in this case, the reflecting region 41v and the non-reflecting region 41w are each disposed concentrically. The disposition position of each of the reflecting region 41v and the non-reflecting region 41w described above corresponds to the period of the wavelength of excitation light. Thus, each of the reflecting region 41v and the non-reflecting region 41w forms a diffraction grating. Accordingly, the optical element 41 reflects excitation light in such a way that ±primary diffracted light caused by diffraction action travels in a direction wider than the regular reflection direction. The diffracted light is excitation light reflected by the reflecting region 41v.

A diameter D4 of the reflecting region 41v in the center region 41x of the optical element 41, a distance D5 between the outside diameter and inside diameter of the reflecting region 41v in a hollow shape in the radial direction of the reflecting region 41v, and a distance D6 between the outside diameter and inside diameter of the non-reflecting region 41w in a hollow shape in the radial direction of the non-reflecting region 41w are substantially the same.

In FIG. 12, the reflecting region 41v and the non-reflecting region 41w are disposed alternately in the radial direction of the optical element 41 for the sake of convenience. However, the disposition positions of the reflecting region 41v and the non-reflecting region 41w correspond to the period of the wavelength of excitation light, and thus the striped pattern is actually finer and a large number of the reflecting regions 41v and a large number of the non-reflecting regions 41w are alternately disposed in the radial direction of the optical element 41. The numbers of the reflecting regions 41v and the non-reflecting regions 41w are as desired.

Excitation light emitted from the emission end face 20b of the optical fiber 20 spreads to an angle wider than the regular reflection direction on the diffraction surface 41u of the optical element 41, and thus the diffraction angle corresponds to the period of the wavelength of excitation light.

In the present embodiment, the emission opening portion 45 includes a transmission region 51 in a region excluding a region where the optical element 41 is disposed from the emission opening portion 45. Thus, the transmission region 51 indicates a region of the emission opening portion 45 where the optical element 41 is not disposed, more specifically, a region inside the emission opening portion 45 and outside the optical element 41.

Next, the operation method in the present embodiment will be described.

The operation from the emission of excitation light from an excitation light source 10 until the excitation light incidents the wavelength conversion unit 40 is the same as that in the first embodiment, and thus the description thereof is omitted.

After being emitted from the emission end face 20b of the optical fiber 20, excitation light travels inside the through hole portion 49a toward the optical element 41 while spreading at the spread angle in accordance with a numerical aperture NA of the optical fiber 20 to irradiate with the optical element 41 (diffraction surface 41u).

The optical element 41 according to the present embodiment reflects excitation light in such a way that ±primary diffracted light caused by diffraction action travels in a direction wider than the regular reflection direction. Thus, compared with a case of regular reflection, excitation light incidenting the optical element 41 irradiate also on the wavelength conversion member 43 near the emission opening portion 45 of the wavelength conversion unit 40 due to diffraction action.

±primary diffracted light of excitation light diffracted by the optical element 41 irradiates with the wavelength conversion member 43 near the emission opening portion 45 of the wavelength conversion unit 40 in a strip shape.

The non-reflecting region 41w absorbs excitation light. Thus, excitation light irradiating with the non-reflecting region 41w of excitation light incidenting the optical element 41 is absorbed by the non-reflecting region 41w and is not leaked out of the optical element 41.

The subsequent operation is substantially the same as that in the first embodiment, and thus the description thereof is omitted.

Thus, in the present embodiment, the same effect as in the first embodiment can be obtained even if excitation light is diffracted by the diffractive optical element 41.

Also in the present embodiment, more excitation light can be irradiated near the emission opening portion 45 of the wavelength conversion unit 40 by disposing the diffractive optical element 41. Accordingly, in the present embodiment, compared with the first embodiment, excitation light can be irradiated with the wavelength conversion member 43 in a wider range. Thus, according to the present embodiment, the absorption range of excitation light in the wavelength conversion member 43 can be widened and the heat generation range can be distributed so that the influence of heat on the wavelength conversion member 43 can be reduced.

In the present embodiment, the optical element 41 is an intensity modulation diffraction grating, but such example is not limitative, and a commonly used phase modulation diffraction grating or reflecting diffraction grating may also be used.

In the present embodiment, the non-reflecting region 41w absorbs excitation light, but such example is not limitative. For example, when a light source device 1 uses a portion of excitation light as illumination light, the non-reflecting region 41w allows excitation light to transmit through. Accordingly, in the present embodiment, excitation light can efficiently be used.

In all the embodiments described above and modifications thereof, the optical element 41 is formed in such a way that, for example, the whole optical element 41 is irradiated with excitation light and the outside diameter of a beam spot is substantially equal to that of the optical element 41. However, in consideration of a tolerance when each member of the light source device 1 is produced or a tolerance when the light source device 1 is assembled, for example, the optical element 41 may be formed in such a way that the outside diameter of the optical element 41 becomes larger than that of a beam spot. Therefore, each member of the light source device 1 has a suitable margin. Accordingly, for example, the optical element 41 may be irradiated with excitation light only partially.

Also, in all the embodiments of the present invention described above and modifications thereof, the wavelength conversion member 43 is irradiated with excitation light on the entire surface thereof, instead of a portion of the wavelength conversion member 43. However, in consideration of a tolerance when each member of the light source device 1 is produced or a tolerance when the light source device 1 is assembled, the wavelength conversion member 43 may be formed so as to be larger than the irradiation region of excitation light with which the wavelength conversion member 43 is irradiated. Therefore, each member of the light source device 1 has a suitable margin.

Even if, for example, the wavelength conversion member 43 is disposed in a region where excitation light is not irradiate due to ease of production or the like, the case is included in the scope of the present invention and the effect thereof can naturally be enjoyed.

The present invention is not limited to the above embodiments as they are and may be embodied by modifying structural elements without deviating from the spirit thereof in the working stage. Also, various inventions can be formed by appropriately combining a plurality of structural elements disclosed in the above embodiments.

What is claimed is:
1. A light source device including:
an excitation light source that emits excitation light;
a light guide member including a light guide incidence end face through which the excitation light emitted from the excitation light source incidents and a light guide emission end face from which the excitation light is emitted, and guiding the excitation light from the light guide incidence end face to the light guide emission end face; and
a wavelength conversion unit that converts the excitation light emitted from the light guide emission end face into wavelength converted light having a desired wavelength, wherein the wavelength conversion unit includes:

an optical element disposed on an optical axis as a center axis of the excitation light emitted from the light guide emission end face and with which the excitation light emitted from the light guide emission end face is irradiated to scatter the excitation light;

a wavelength conversion member disposed on an optical path of the excitation light scattered by the optical element and with which the excitation light is irradiated when the excitation light is scattered to convert the irradiated excitation light into the wavelength converted light; and an emission opening portion that emits the wavelength converted light converted by the wavelength conversion member to an outside of the wavelength conversion unit, wherein the wavelength conversion member includes an incidence end face on which the excitation light is incident when the wavelength conversion member is irradiated with the excitation light and an emission end face from which the wavelength converted light is emitted and which is the same surface as the incidence end face, wherein the wavelength conversion member is a desired distance away from the optical element, and wherein the optical element includes a scattering optical element having a scattering surface that scatters the excitation light in a random direction and the scattering surface is opposed to the light guide emission end face.

2. The light source device according to claim 1, wherein the optical element is disposed on the same surface as the emission opening portion and the emission opening portion includes a transmission region to transmit through for the wavelength converted light to be emitted to the outside of the wavelength conversion unit in a region obtained by excluding a region where the optical element is disposed from the emission opening portion.

3. The light source device according to claim 2, wherein the optical element has a circular shape and a center of the optical element is disposed on the optical axis.

4. The light source device according to claim 1, wherein the optical element is disposed inside the wavelength conversion unit on a side of the light guide emission end face, and the emission opening portion includes a transmission region to transmit through for the wavelength converted light to be emitted to the outside of the wavelength conversion unit.

5. The light source device according to claim 4, wherein the scattering surface protrudes toward the light guide emission end face, is disposed rotationally symmetrically with the optical axis set as a rotation axis, and is inclined with respect to the optical axis.

6. The light source device according to claim 4, wherein the wavelength conversion unit further includes a holding member whose center axis is disposed on the optical axis and which has a concave shape to hold the wavelength conversion member on an entire inner circumferential surface of a recess portion, the side of an opening portion of the recess portion is the emission opening portion, a bottom surface of the recess portion is disposed on the side of the light guide emission end face, the bottom surface of the recess portion includes a recess opening portion through which the excitation light emitted from the light guide emission end face passes, and the light guide emission end face is disposed inside the recess portion or near the recess opening portion so as to be opposed to the optical element.

7. The light source device according to claim 6, wherein the recess portion has a truncated conical shape whose diameter increases from the bottom surface toward the opening portion.

8. The light source device according to claim 6, wherein the recess portion has a shape having a portion of a sphere.

9. The light source device according to claim 6, wherein the light guide emission end face is disposed inside the holding member and a distance from the light guide emission end face to the optical element is shorter than that from the wavelength conversion member to the optical element.

10. The light source device according to claim 1, wherein the optical element is formed so as to have an outside diameter substantially equal to that of a beam spot of the excitation light formed on the optical element.

11. A light source device including:

an excitation light source that emits excitation light;

a light guide member including a light guide incidence end face through which the excitation light emitted from the excitation light source incidents and a light guide emission end face from which the excitation light is emitted, and guiding the excitation light from the light guide incidence end face to the light guide emission end face; and a wavelength conversion unit that converts the excitation light emitted from the light guide emission end face into wavelength converted light having a desired wavelength, wherein the wavelength conversion unit includes:

an optical element disposed on an optical axis as a center axis of the excitation light emitted from the light guide emission end face and with which the excitation light emitted from the light guide emission end face is irradiated to reflect the excitation light;

a wavelength conversion member disposed on an optical path of the excitation light reflected by the optical element and with which the excitation light is irradiated when the excitation light is reflected to convert the irradiated excitation light into the wavelength converted light; and an emission opening portion that emits the wavelength converted light converted by the wavelength conversion member to an outside of the wavelength conversion unit, wherein the wavelength conversion member includes an incidence end face on which the excitation light is incident when the wavelength conversion member is irradiated with the excitation light and an emission end face from which the wavelength converted light is emitted and which is the same surface as the incidence end face, wherein the wavelength conversion member is a desired distance away from the optical element, wherein the optical element includes a reflecting optical element having a reflecting surface that reflects the excitation light and the reflecting surface is opposed to the light guide emission end face, wherein the optical element is disposed on the same surface as the emission opening portion and the emission opening portion includes a transmission region to transmit through for the wavelength converted light to be emitted to the outside of the wavelength conversion unit in a region obtained by excluding a region where the optical element is disposed from the emission opening portion, wherein the optical element has a circular shape and a center of the optical element is disposed on the optical axis, wherein the wavelength conversion unit further includes:
- a holding member in a flat shape which has an opening portion in which the light guide emission end face is disposed, which is disposed on the optical axis and through which the excitation light passes, holds the wavelength conversion member in a region excluding the opening portion of an end face of the holding member on a forward side in a traveling direction of the excitation light, and is disposed in a direction perpendicular to the optical axis; and
- a transmission member on which the reflecting surface abuts so that a center of the reflecting surface is disposed on the optical axis, which is disposed on the wavelength conversion member, and through which the excitation light and the wavelength converted light transmit, and wherein the emission opening portion includes the transmission region on the surface of the transmission member excluding the optical element.

12. A light source device including:
an excitation light source that emits excitation light;
a light guide member including a light guide incidence end face through which the excitation light emitted from the excitation light source incidents and a light guide emission end face from which the excitation light is emitted, and guiding the excitation light from the light guide incidence end face to the light guide emission end face; and
a wavelength conversion unit that converts the excitation light emitted from the light guide emission end face into wavelength converted light having a desired wavelength, wherein the wavelength conversion unit includes:
- an optical element disposed on an optical axis as a center axis of the excitation light emitted from the light guide emission end face and with which the excitation light emitted from the light guide emission end face is irradiated to reflect the excitation light;
- a wavelength conversion member disposed on an optical path of the excitation light reflected by the optical element and with which the excitation light is irradiated when the excitation light is reflected to convert the irradiated excitation light into the wavelength converted light; and
- an emission opening portion that emits the wavelength converted light converted by the wavelength conversion member to an outside of the wavelength conversion unit, wherein the wavelength conversion member includes an incidence end face on which the excitation light is incident when the wavelength conversion member is irradiated with the excitation light and an emission end face from which the wavelength converted light is emitted and which is the same surface as the incidence end face, wherein the wavelength conversion member is a desired distance away from the optical element, wherein the optical element includes a reflecting optical element having a reflecting surface that reflects the excitation light and the reflecting surface is opposed to the light guide emission end face, wherein the optical element is disposed on the same surface as the emission opening portion and the emission opening portion includes a transmission region to transmit through for the wavelength converted light to be emitted to the outside of the wavelength conversion unit in a region obtained by excluding a region where the optical element is disposed from the emission opening portion, wherein the reflecting surface protrudes toward the light guide emission end face, is disposed rotationally symmetrically with the optical axis set as a rotation axis, and is inclined with respect to the optical axis, and wherein if a maximum angle between an emission direction of the excitation light emitted from the light guide emission end face toward the reflecting surface and the optical axis is an angle $\phi$,
- an angle formed between the inclined reflecting surface and the optical axis is an inclination angle $\alpha$, and
- an angle formed between the emission direction of the excitation light emitted from the light guide emission end face toward the reflecting surface and a traveling direction of the excitation light reflected by the reflecting surface regarding the traveling direction of the excitation light reflected by the reflecting surface when the excitation light emitted at the angle $\phi$ is reflected by the reflecting surface to irradiate with the wavelength conversion member is an angle $\beta$, the angle $\beta$ is larger than $\pi/2$.

13. The light source device according to claim 12, wherein the optical element has a conical shape and the reflecting surface is formed on a conical surface of a cone.

14. The light source device according to claim 12, wherein the optical element has a shape obtained by cutting off a portion of a sphere and the reflecting surface is formed as a curved surface of the sphere.

15. A light source device including:
an excitation light source that emits excitation light;
a light guide member including a light guide incidence end face through which the excitation light emitted from the excitation light source incidents and a light guide emission end face from which the excitation light is emitted, and guiding the excitation light from the light guide incidence end face to the light guide emission end face; and
a wavelength conversion unit that converts the excitation light emitted from the light guide emission end face into wavelength converted light having a desired wavelength, wherein the wavelength conversion unit includes:
- an optical element disposed on an optical axis as a center axis of the excitation light emitted from the light guide emission end face and with which the excitation light emitted from the light guide emission end face is irradiated to reflect the excitation light;
- a wavelength conversion member disposed on an optical path of the excitation light reflected by the optical element and with which the excitation light is irradiated when the excitation light is reflected to convert the irradiated excitation light into the wavelength converted light; and
- an emission opening portion that emits the wavelength converted light converted by the wavelength conversion member to an outside of the wavelength conversion unit, wherein the wavelength conversion member includes an incidence end face on which the excitation light is incident when the wavelength conversion member is irradiated with the excitation light and an emission end face from which the wavelength converted light is emitted and which is the same surface as the incidence end face, wherein the wavelength conversion member is a desired distance away from the optical element, wherein the optical element includes a reflecting optical element having a reflecting surface that reflects the excitation light and the reflecting surface is opposed to the light guide emission end face, and wherein the optical element reflects the excitation light emitted from the light guide emission end face, allows the wavelength converted light whose wavelength is converted by the wavelength conversion member to transmit through, and is disposed in the emission opening portion of the wavelength conversion unit.

16. The light source device according to claim 15, wherein the optical element includes a transmission region disposed on the entire surface of the emission opening portion to transmit through so that the wavelength converted light is emitted to the outside of the wavelength conversion unit.

17. A light source device including:

an excitation light source that emits excitation light;

a light guide member including a light guide incidence end face through which the excitation light emitted from the excitation light source incidents and a light guide emission end face from which the excitation light is emitted, and guiding the excitation light from the light guide incidence end face to the light guide emission end face; and a wavelength conversion unit that converts the excitation light emitted from the light guide emission end face into wavelength converted light having a desired wavelength, wherein the wavelength conversion unit includes:

an optical element disposed on an optical axis as a center axis of the excitation light emitted from the light guide emission end face and with which the excitation light emitted from the light guide emission end face is irradiated to diffract the excitation light;

a wavelength conversion member disposed on an optical path of the excitation light diffracted by the optical element and with which the excitation light is irradiated when the excitation light is diffracted to convert the irradiated excitation light into the wavelength converted light; and an emission opening portion that emits the wavelength converted light converted by the wavelength conversion member to an outside of the wavelength conversion unit, wherein the wavelength conversion member includes an incidence end face on which the excitation light is incident when the wavelength conversion member is irradiated with the excitation light and an emission end face from which the wavelength converted light is emitted and which is the same surface as the incidence end face, wherein the wavelength conversion member is a desired distance away from the optical element, and wherein the optical element includes a diffractive optical element having a diffraction surface that diffracts the excitation light and the diffraction surface is opposed to the light guide emission end face.

18. The light source device according to claim 17, wherein the optical element is disposed on the same surface as the emission opening portion and the emission opening portion includes a transmission region to transmit through for the excitation light to be emitted to the outside of the wavelength conversion unit in a region obtained by excluding a region where the optical element is disposed from the emission opening portion.

19. The light source device according to claim 18, wherein the optical element has a circular shape and a center of the optical element is disposed on the optical axis.

20. The light source device according to claim 19, wherein the wavelength conversion unit further includes a holding member having a through hole portion whose center axis is disposed on the optical axis to hold the wavelength conversion member on the entire surface of an inner circumferential surface of the through hole portion, the through hole portion includes a first through hole portion whose center is disposed on the optical axis to be an incidence opening portion of the wavelength conversion unit through which the excitation light incidents the wavelength conversion unit and a second through hole portion whose center is disposed on the optical axis to be the emission opening portion, and the light guide emission end face is disposed inside the through hole portion or on the first through hole portion so as to be opposed to the optical element.

21. The light source device according to claim 20, wherein the through hole portion has a truncated conical shape whose diameter increases from the first through hole portion toward the second through hole portion.

22. The light source device according to claim 21, wherein the through hole portion has a semispherical shape having a portion of a sphere.

* * * * *